(12) United States Patent
Yu et al.

(10) Patent No.: US 11,062,837 B2
(45) Date of Patent: Jul. 13, 2021

(54) PLANAR TRANSFORMER, POWER CONVERSION CIRCUIT, AND ADAPTER

(71) Applicant: Huawei Technologies Co., Ltd., Shenzhen (CN)

(72) Inventors: Peng Yu, Dongguan (CN); Wei Chen, Fuzhou (CN); Jie Ren, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/871,145

(22) Filed: May 11, 2020

(65) Prior Publication Data

US 2020/0273617 A1 Aug. 27, 2020

Related U.S. Application Data

(63) Continuation of application No. PCT/CN2018/114303, filed on Nov. 7, 2018.

(30) Foreign Application Priority Data

Nov. 10, 2017 (CN) .......................... 201711105655.5
Dec. 28, 2017 (CN) .......................... 201711461419.7

(51) Int. Cl.
*H01F 27/28* (2006.01)
*H01F 27/29* (2006.01)
(Continued)

(52) U.S. Cl.
CPC ......... *H01F 27/2804* (2013.01); *H01F 27/29* (2013.01); *H01F 27/33* (2013.01);
(Continued)

(58) Field of Classification Search
CPC ...... H01F 27/2804; H01F 27/29; H01F 27/33; H01F 27/38; H01F 2027/2809;
(Continued)

(56) References Cited

U.S. PATENT DOCUMENTS 9,589,718 B2 * 3/2017 Yang ....................... H01F 27/36
9,871,452 B2 * 1/2018 Huang .................... H02M 1/44
(Continued)

FOREIGN PATENT DOCUMENTS

CN           1993780 A       7/2007
CN        100576378 C      12/2009
(Continued)

OTHER PUBLICATIONS

Xie, L., et al., "Shielding-Cancellation Technique for Suppressing Common Mode EMI in Isolated Power Converters," 2014, IEEE, pp. 4769-4776.

*Primary Examiner* — Thienvu V Tran
*Assistant Examiner* — Shahzeb K Ahmad
(74) *Attorney, Agent, or Firm* — Conley Rose, P.C.

(57) ABSTRACT

A planar transformer includes a primary winding including a first primary winding layer, a secondary winding including a first secondary winding layer, where an $N_{s1}^{th}$ turn of coil to an $(N_{s1}+B_1-1)^{th}$ turn of coil in the secondary winding are disposed at the first secondary winding layer, and a charge balance winding including a first charge balance winding layer, where the first charge balance winding layer is disposed between the first primary winding layer and the first secondary winding layer, and is adjacent to the first primary winding layer and the first secondary winding layer. $N_1$ turns of coils are disposed at the first charge balance winding layer, where $N_1$ is greater than or equal to $N_{b1}$.

20 Claims, 15 Drawing Sheets

(51) Int. Cl.
*H01F 27/33* (2006.01)
*H02M 3/335* (2006.01)

(52) U.S. Cl.
CPC ..... *H02M 3/335* (2013.01); *H01F 2027/2809* (2013.01); *H01F 2027/2819* (2013.01)

(58) Field of Classification Search
CPC ..... H01F 2027/2819; H01F 2027/2861; H01F 17/0006; H01F 17/0013; H01F 41/041; H01F 41/04; H02M 3/335–33592
USPC ........................................................ 336/232
See application file for complete search history.

(56) References Cited

U.S. PATENT DOCUMENTS

| | | | |
|---|---|---|---|
| 10,510,477 B2* | 12/2019 | Chung | H02M 7/217 |
| 2005/0146902 A1* | 7/2005 | Odell | H01F 38/42 |
| | | | 363/21.12 |
| 2005/0242916 A1 | 11/2005 | So | |
| 2006/0120114 A1* | 6/2006 | Kawasaki | H02M 3/33592 |
| | | | 363/16 |
| 2007/0171585 A1 | 7/2007 | Sicong et al. | |
| 2009/0003191 A1 | 1/2009 | Inuzuka et al. | |
| 2009/0231885 A1* | 9/2009 | Won | H01F 38/10 |
| | | | 363/17 |
| 2013/0235619 A1* | 9/2013 | Zhou | H01F 27/36 |
| | | | 363/21.04 |
| 2013/0242452 A1 | 9/2013 | Park | |
| 2014/0292471 A1 | 10/2014 | Ho et al. | |
| 2015/0061805 A1* | 3/2015 | Eom | H01F 27/2804 |
| | | | 336/65 |
| 2015/0179334 A1 | 6/2015 | Jeong et al. | |
| 2015/0318104 A1 | 11/2015 | Chang et al. | |
| 2016/0372254 A1 | 12/2016 | Harada et al. | |
| 2017/0047848 A1 | 2/2017 | Huang et al. | |
| 2017/0186529 A1* | 6/2017 | Zuo | H01F 27/24 |
| 2017/0200552 A1 | 7/2017 | Chung et al. | |
| 2018/0277300 A1* | 9/2018 | Sheng | H01F 38/42 |

FOREIGN PATENT DOCUMENTS

| | | |
|---|---|---|
| CN | 201622921 U | 11/2010 |
| CN | 101114541 B | 5/2011 |
| CN | 203013469 U | 6/2013 |
| CN | 103700484 A | 4/2014 |
| CN | 104103408 A | 10/2014 |
| CN | 104183373 A | 12/2014 |
| CN | 204167063 U | 2/2015 |
| CN | 104733166 A | 6/2015 |
| CN | 204651134 U | 9/2015 |
| CN | 105047380 A | 11/2015 |
| CN | 105047385 A | 11/2015 |
| CN | 103310956 B | 3/2016 |
| CN | 105405606 A | 3/2016 |
| CN | 105609300 A | 5/2016 |
| CN | 106068541 A | 11/2016 |
| CN | 105099205 B | 12/2017 |
| CN | 108364768 A | 8/2018 |
| EP | 1239578 A2 | 9/2002 |
| JP | 2002203718 A | 7/2002 |

* cited by examiner

PLANAR TRANSFORMER, POWER CONVERSION CIRCUIT, AND ADAPTER

CROSS-REFERENCE TO RELATED APPLICATIONS

This application is a continuation of International Patent Application No. PCT/CN2018/114303 filed on Nov. 7, 2018, which claims priority to Chinese Patent Application No. 201711105655.5 filed on Nov. 10, 2017 and Chinese Patent Application No. 201711461419.7 filed on Dec. 28, 2017. The disclosures of the aforementioned applications are hereby incorporated by reference in their entireties.

TECHNICAL FIELD

This application relates to the field of circuits, and in particular, to a planar transformer, a power conversion circuit, and an adapter.

BACKGROUND

Switch mode power supplies are rapidly developed because of their advantages of high efficiency, small volumes, and good output stability. However, a problem of electromagnetic interference (EMI) occurring during working of the switch mode power supply is very prominent. The EMI of the switch mode power supply mainly comes from an external interference source, turn-off and conduction of a switching device of the switch mode power supply, direction recovery of a rectifier diode, and noise generated by a capacitor/an inductor/a conducting wire. These noise signals are conducted and radiated to an electrical device along a circuit network, causing the EMI. Therefore, the switch mode power supply has very strict requirements on noise suppression.

Noise of the switch mode power supply is classified into differential mode noise and common mode noise. The differential mode noise mainly includes noise arising from a pulsating current of a switching converter. The common mode noise mainly includes noise to reference ground that is generated due to interaction between parameters of a circuit of the switch mode power supply. How to reduce and even eliminate the noise of the switch mode power supply is a problem of great concern in the industry.

SUMMARY

This application provides a planar transformer, a power conversion circuit, and an adapter, to improve noise suppression performance.

According to a first aspect, a planar transformer is provided. The planar transformer includes a primary winding, including a first primary winding layer, a secondary winding, including a first secondary winding layer, where an $N_{s1}^{th}$ turn of coil to an $(N_{s1}+B_1-1)^{th}$ turn of coil in the secondary winding are disposed at the first secondary winding layer, and a first turn of coil in the secondary winding is configured to connect to a potential cold point of a secondary circuit of a power conversion circuit, where $N_{s1}$ and $B_1$ are positive numbers, and a charge balance winding, including a first charge balance winding layer, where the first charge balance winding layer is disposed between the first primary winding layer and the first secondary winding layer, and is adjacent to the first primary winding layer and the first secondary winding layer. A first terminal of the first charge balance winding layer is configured to connect to a potential cold point of a primary circuit of the power conversion circuit. $N_1$ turns of coils are disposed at the first charge balance winding layer. When the planar transformer works, an average value of first induced voltages generated by $N_{b1}$ turns of coils is equal to an average value of second induced voltages generated by the first secondary winding layer, where $N_1$ and $N_{b1}$ are positive numbers, and $N_1$ is greater than or equal to $N_{b1}$.

In this embodiment of this application, the charge balance winding is disposed between the primary winding and the secondary winding of the planar transformer, and a quantity of turns of coils at the first charge balance winding layer included in the charge balance winding is designed such that when the planar transformer works, induced voltages of at least some coils in the first charge balance winding layer can be used to balance an induced voltage of the first secondary winding layer, to suppress common mode noise generated by the secondary winding, thereby improving noise suppression performance.

In a possible implementation, $N_1$ and $N_{b1}$ satisfy the following condition $N_1=N_{b1}+C_1$, and $N_{b1}=2*N_{s1}+B_1-2$, where $C_1$ is a real number, and $C_1$ turns of coils are configured to at least balance, using a noise current generated when a generated induced voltage is coupled to the secondary winding, a noise current generated when a potential jump of the primary winding is coupled to the secondary winding through an inter-turn gap of the charge balance winding.

In a possible implementation, a value range of $C_1$ is $[0, 1.1*N_{b1}]$.

In a possible implementation, the primary winding further includes a second primary winding layer, the secondary winding further includes a second secondary winding layer, and an $N_{s2}^{th}$ turn of coil to an $(N_{s2}+B_2-1)^{th}$ turn of coil in the secondary winding are disposed at the second secondary winding layer, where $N_{s2}$ and $B_2$ are positive numbers, the charge balance winding further includes a second charge balance winding layer, the second charge balance winding layer is disposed between the second primary winding layer and the second secondary winding layer, and is adjacent to the second primary winding layer and the second secondary winding layer, a first terminal of the second charge balance winding layer is configured to connect to the potential cold point of the primary circuit of the power conversion circuit, $N_2$ turns of coils are disposed at the second charge balance winding layer, where $N_2$ is greater than or equal to $N_{b2}$, and when the planar transformer works, an average value of third induced voltages generated by $N_{b2}$ turns of coils is equal to an average value of fourth induced voltages generated by the second secondary winding layer, where $N_2$ and $N_{b2}$ are positive numbers.

In this embodiment of this application, the charge balance winding is disposed between the primary winding and the secondary winding of the planar transformer, the charge balance winding includes the first charge balance winding layer and the second charge balance winding layer, and a quantity of turns of coils in the charge balance winding is designed such that when the planar transformer works, induced voltages of at least some coils in the charge balance winding can be used to balance an induced voltage of the secondary winding, to suppress common mode noise generated by the secondary winding, thereby improving noise suppression performance.

In a possible implementation, $N_2$, $N_{b1}$, and $N_{b2}$ satisfy the following condition: $N_2=N_{b2}+C_2$, $N_{b1}=2*N_{s1}+B_1-2$, $N_{b2}=2*N_{s2}+B_2-2$, and $N_{b2} \geq N_{b1}$, where $C_2$ is a real number, and $C_2$ turns of coils are configured to at least balance, using a noise current generated when a generated induced voltage is coupled to the secondary winding, a noise current generated when a potential jump of the primary winding is coupled to the secondary winding through an inter-turn gap of the charge balance winding.

In a possible implementation, a value range of $C_2$ is $[0, 1.1*N_{b2}]$.

In a possible implementation, the primary winding includes a primary power winding, the first terminal of the first charge balance winding layer and a first terminal of the primary power winding are dotted terminals, and the first terminal of the primary power winding is configured to connect to a hot point of the primary circuit.

In this embodiment of this application, the first terminal of the first charge balance winding layer and the first terminal of the primary power winding are set as the dotted terminals such that a direction of an induced current generated by the first charge balance winding layer is opposite to a direction of a noise current to ground generated by the primary winding, thereby suppressing the noise current to ground generated by the primary winding, and improving noise suppression performance of the power conversion circuit.

In a possible implementation, the primary winding includes an auxiliary power supply winding, the $N_1$ turns of coils disposed at the first charge balance winding layer are a first turn of coil to an $N_1^{th}$ turn of coil in the auxiliary power supply winding, and the first turn of coil in the auxiliary power supply winding is configured to connect to working ground of the primary circuit.

In this embodiment of this application, the charge balance winding is disposed in the planar transformer, alternatively the auxiliary power supply winding may be used as the charge balance winding, to suppress noise in the power conversion circuit, reduce a volume of the planar transformer, and reduce manufacturing costs.

In a possible implementation, the primary winding is disposed on two sides of the secondary winding, or the secondary winding is disposed on two sides of the primary winding.

In a possible implementation, when the planar transformer works, a second terminal of the $N_1$ turns of coils disposed at the first charge balance winding layer is electrically connected to no conductor, and is electrically connected to no element.

In a possible implementation, $B_1=1$.

In a possible implementation, the $N_1$ turns of coils at the first charge balance winding layer form a toroidal winding, a width of an $i^{th}$ turn of coil in the toroidal winding is greater than a width of an $(i+1)^{th}$ turn of coil in the toroidal winding, and an average radius of the $i^{th}$ turn of coil is less than an average radius of the $(i+1)^{th}$ turn of coil, where $N_1-1 \geq i \geq 1$.

In this embodiment of this application, widths of all turns of coils at the charge balance winding layer are gradually decreased from inside to outside such that capacitance between the charge balance winding layer and the adjacent secondary winding layer is evenly distributed, thereby improving noise suppression performance.

In a possible implementation, the turn width of the $i^{th}$ turn of coil satisfies the following condition: $R_i=R_{+1}*a_{+1}/a_i$, where $R_1$ is the average radius of the $i^{th}$ turn of coil, $R_{i+1}$ is the average radius of the $(i+1)^{th}$ turn of coil, $a_i$ is the width of the $i^{th}$ turn of coil, and $a_{+1}$ is the width of the $(i+1)^{th}$ turn of coil.

In this embodiment of this application, for the toroidal winding, the widths of all the turns of coils at the charge balance winding layer from inside to outside are set such that areas of all the turns of coils are equal, and the capacitance between the charge balance winding layer and the adjacent secondary winding layer is evenly distributed, thereby improving the noise suppression performance.

According to a second aspect, a power conversion circuit is provided. The power conversion circuit includes the planar transformer, the primary circuit, and the secondary circuit according to any one of the first aspect or the possible implementations of the first aspect. The planar transformer is disposed between the primary circuit and the secondary circuit.

According to a third aspect, an adapter is provided. The adapter includes the power conversion circuit according to the second aspect.

DESCRIPTION OF EMBODIMENTS

Figure 1:
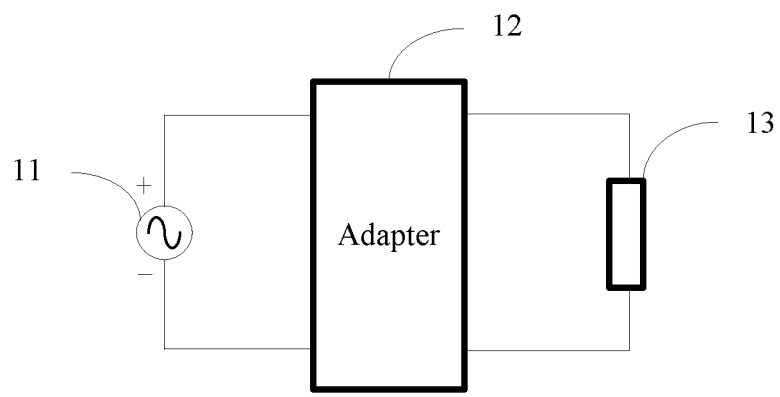
FIG. 1 is a schematic diagram of a possible application scenario according to an embodiment of this application.

The following describes technical solutions of this application with reference to accompanying drawings.

For ease of understanding of embodiments of this application, some terms used in the embodiments of this application are first described below.

Planar transformer: Different from a conventional transformer structure, a magnetic core and a winding of the planar transformer have planar structures. The magnetic core usually uses a small-sized E-type or RM-type magnetic core structure. The winding is usually formed through lap winding of a plurality of layers of printed circuit boards (PCBs). Such a design has relatively low direct current resistance, relatively small leakage inductance and distributed capacitance, and a very small height, and may have a relatively high operating frequency.

Flyback converter: The flyback converter is widely applied to alternating current/direct current (AC/DC) and direct current/direct current (DC/DC) conversion and is a relatively common low-power switch mode power supply converter with advantages of a simple structure and low costs. Core components of the flyback converter include a power transistor, a transformer, a diode, and a capacitor. The power transistor is controlled through pulse width modulation, generates a high-frequency square wave signal in a primary coil of the transformer after being turned off and conducted, and then is inductively coupled to a secondary coil of the transformer to transfer energy. Stable direct current output is obtained on an output end through a filtering and rectification function of a diode and a capacitor of a secondary circuit.

Common mode noise: The common mode noise is also referred to as asymmetric noise or line-to-ground noise. Such noise exists in all electrical devices using alternating current power supplies. Currents of the common mode noise flow in a same direction on two transmission lines, maintain a same phase to ground, and return through a ground cable. The common mode noise can be suppressed between common mode inductors and the ground or between two transmission lines and the ground using a Y capacitor.

Differential mode noise: The differential mode noise is also referred to as normal mode noise, symmetric noise, or inter-line noise. The differential mode noise exists in an alternating current line and a neutral line, and a phase difference between the alternating current line and the neutral line is 180°. A differential mode noise current flows out along an alternating current line and returns along another alternating current line. There is no differential mode noise current in a ground cable.

Potential cold point: In a circuit network, an amplitude of a voltage potential on a node of the network remains relatively constant during working of a circuit, with no high-frequency jump or oscillation. For example, for a filter capacitor existing after rectification of a primary side circuit of a flyback converter and a filter capacitor existing after rectification of a secondary side circuit, positive electrodes or negative electrodes of these capacitors and network nodes directly connected the positive electrodes or negative electrodes are potential cold points.

Hot point of a primary circuit: The hot point may be a circuit node or a network having a voltage jump on a primary side of a circuit topology as a primary switching transistor is turned on and off, for example, a node at which a primary power winding is connected to a switching transistor.

Winding layer: In a planar transformer, the winding layer is a multi-turn coil located in a same plane in a winding. The plane is perpendicular to a central axis of a magnetic core surrounded by the winding, and the multi-turn coil may be wound in parallel in the same plane from inside to outside. In one winding, there may be a plurality of winding layers. Planes in which the winding layers are located are parallel to each other, and planes in which the winding layers are located are arranged perpendicular to the central axis of the magnetic core. Correspondingly, two adjacent winding layers are two winding layers that are located at parallel planes and there is no other winding layer between the two adjacent winding layers.

This application provides a planar transformer, a power conversion circuit, and an adapter. The planar transformer may be disposed in the power conversion circuit, and the power conversion circuit may be disposed in the adapter.

The adapter may be applied to a scenario for charging or supplying power to a device. For example, FIG. 1 shows a possible application scenario according to an embodiment of this application. As shown in FIG. 1, the application scenario includes an external power supply 11, an adapter 12, and a to-be-charged device 13. For example, the to-be-charged device 13 may include a cellular phone, a notebook computer, and a battery. This is not limited in this embodiment of this application. Usually, the adapter 12 may be connected to the external power supply 11, and a power conversion circuit included in the adapter 12 is configured to convert a relatively high voltage provided by the external power supply 11 into a relatively low voltage conforming to a charging or power supplying standard for the to-be-charged device 13, and charge or supply power to the to-be-charged device 13.

The planar transformer provided in this embodiment of this application can reduce noise generated during working. The noise may include common mode noise. Further, the noise may include differential mode noise. The power conversion circuit may be a switch mode power supply converter. For example, the switch mode power supply converter may include the foregoing flyback converter. In a related technology, noise of a switch mode power supply is classified into differential mode noise and common mode noise. The differential mode noise mainly arises from a pulsating current of a switching converter, and can be suppressed using a filter. The common mode noise is mainly noise to reference ground that is generated due to interaction between parameters of a circuit of the switch mode power supply. A mechanism for generating and transmitting common mode noise in a power conversion circuit 20 is described below with reference to FIG. 2 and FIG. 3.

Figure 2:
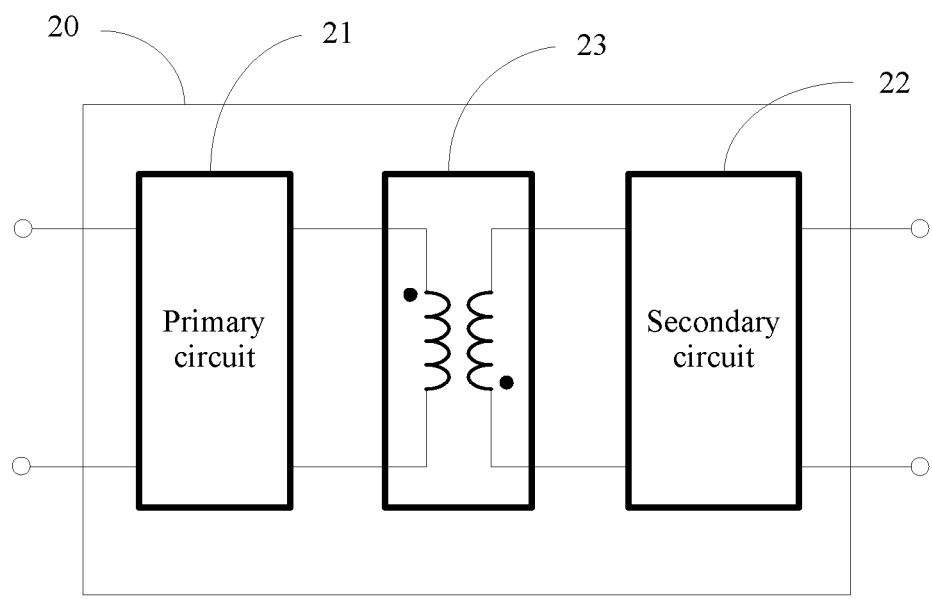
FIG. 2 is a schematic diagram of a power conversion circuit according to an embodiment of this application.
Figure 3:
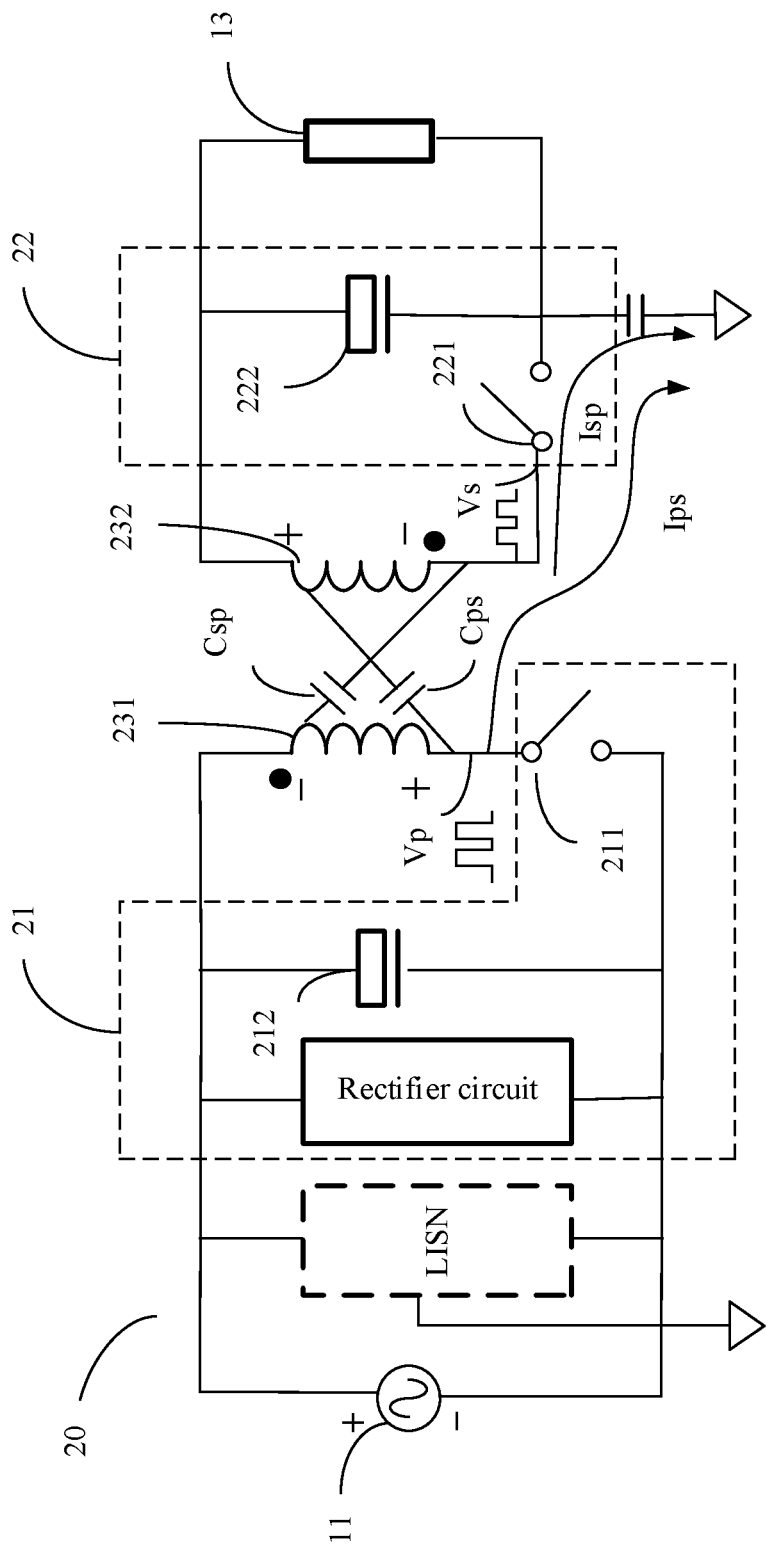
FIG. 3 is a schematic diagram of a power conversion circuit according to another embodiment of this application.

As shown in FIG. 2, the power conversion circuit 20 usually includes a primary circuit 21, a secondary circuit 22, and a transformer 23. As shown in FIG. 3, the primary circuit 21 usually includes a primary switching transistor 211 and a primary filter capacitor 212. Further, the primary circuit 21 further includes a rectifier circuit. The primary switching transistor 211 may also be referred to as a power transistor. The secondary circuit 22 usually includes a secondary rectifier diode 221 and a secondary filter capacitor 222. The transformer 23 includes a primary winding 231, a magnetic core, and a secondary winding 232. The primary winding 231 may be connected to the primary switching transistor 211 and the primary filter capacitor 212. The secondary winding 232 may be connected to the secondary rectifier diode 221 and the secondary filter capacitor 222. The primary filter capacitor 212 and the secondary filter capacitor 222 are usually electrolytic capacitors.

Usually, a node connected to either of two ends of the primary filter capacitor 212 is a potential cold point of the primary circuit, or a ground node of the primary circuit may be a potential cold point of the primary circuit. A node connected to either of two ends of the secondary filter capacitor 222 is a potential cold point of the secondary circuit. In this embodiment of this application, the potential cold point of the primary circuit may also be referred to as a primary potential cold point, and the potential cold point of the secondary circuit may also be referred to as a secondary potential cold point.

When the power conversion circuit 20 works, after an alternating current input by the external power supply 11 is rectified and filtered by the primary circuit 21, the alternating current is converted into a stable high-voltage direct current and then the direct current is input to the primary winding 231 of the transformer 23. The primary switching transistor 211 connected to the primary winding 231 is conducted and turned off at high frequency, to couple a voltage on the primary winding 231 to the secondary winding 232. The voltage coupled to the secondary winding 232 is rectified and filtered by the secondary circuit 22 and then a low-voltage direct current is output to a load, to charge or supply power to the load. The load is the to-be-charged device 13. During working of the power conversion circuit 20, the primary switching transistor 211 and the secondary rectifier diode 221 generate jump voltages Vp and Vs respectively because the primary switching transistor 211 is conducted and turned off at high frequency, to generate jump voltages Vp and Vs respectively. Because parasitic capacitance exists between the primary winding 231 and the secondary winding 232 of the transformer, the jump voltages Vp and Vs generate common mode noise in the power conversion circuit using the parasitic capacitance.

Further, referring to FIG. 3, the parasitic capacitance includes distributed capacitance Cps between the primary winding and the secondary winding and distributed capacitance Csp between the secondary winding and the primary winding. The jump voltage Vp in the primary circuit generates, using Cps, a noise current Ips flowing to the ground, and the jump voltage Vs in the secondary circuit generates, using Csp, a noise current Isp flowing to the ground. The noise current Ips and the noise current Isp are common mode noise.

How to suppress the common mode noise is one of difficulties in designing a highly competitive adapter in the industry currently.

It should be noted that, FIG. 3 further shows a line impedance stabilization network (LISN) circuit. The LISN circuit is a test circuit and is configured to, when the power conversion circuit works, detect a common mode noise current flowing to the ground. That is, it may be considered that a detected current to ground flowing to the LISN circuit is equivalent to common mode noise generated by the power conversion circuit.

Figure 4:
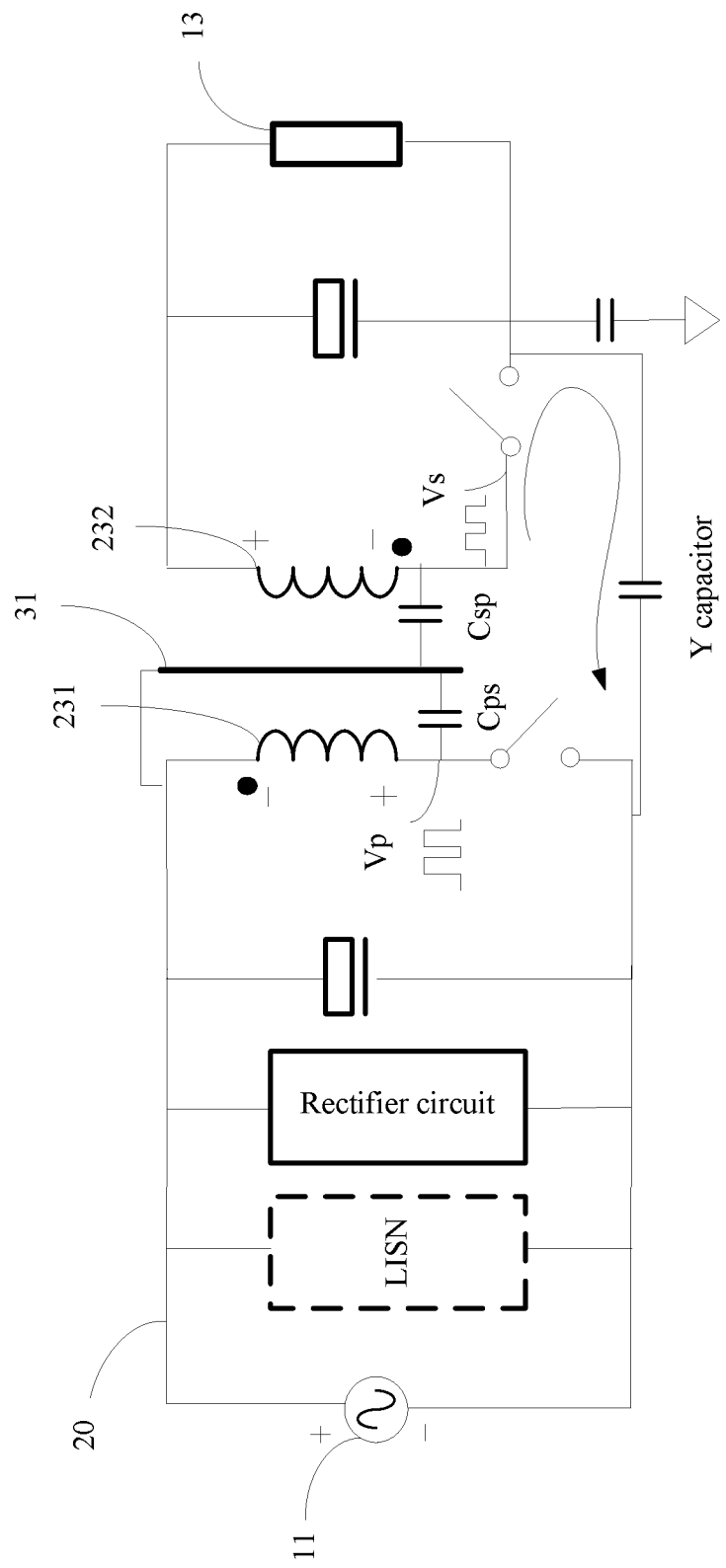
FIG. 4 is a schematic diagram of a noise suppression method according to an embodiment of this application.

FIG. 4 is a schematic diagram of a noise suppression method in technology. Referring to FIG. 4, a shielding method using a shielding enclosure may be used. The shielding enclosure 31 is connected to the primary potential cold point, and is wrapped around the primary winding 231, to shield the common mode noise of the primary jump voltage Vp for the secondary winding 232. In addition, a Y capacitor may be disposed between the primary circuit and the secondary circuit of the power conversion circuit 20. Two ends of the Y capacitor may be connected to the primary potential cold point and the secondary potential cold point respectively. That is, the foregoing connection manner is equivalent to connecting the Y capacitor in parallel on two sides of the LISN, and common mode noise that originally passes through the LISN is shunted through a branch of the Y capacitor, to reduce noise currents detected by the LISN.

However, the shielding enclosure 31 cannot eliminate the noise sources Vp and Vs from the source, and the added Y capacitor not only causes an increase in costs and an increase in a volume, but also leads to a power frequency leakage current between the primary circuit 21 and the secondary circuit 22, resulting in a leakage safety risk.

For the foregoing problem, embodiments of this application provide a planar transformer, a power conversion circuit, and an adapter, to provide a solution to improving noise suppression performance of the power conversion circuit. Further, because common mode noise can be fully suppressed, for the power conversion circuit in the embodiments of this application, a Y capacitor bridged between a primary circuit and a secondary circuit may be removed, to provide a safer power conversion circuit without a Y capacitor.

A power conversion circuit 50 in an embodiment of this application is described in detail below with reference to the accompanying drawings. The power conversion circuit 50 may be applied to an adapter. The power conversion circuit 50 includes a primary circuit 51, a secondary circuit 52, and a planar transformer 60.

Figure 5:
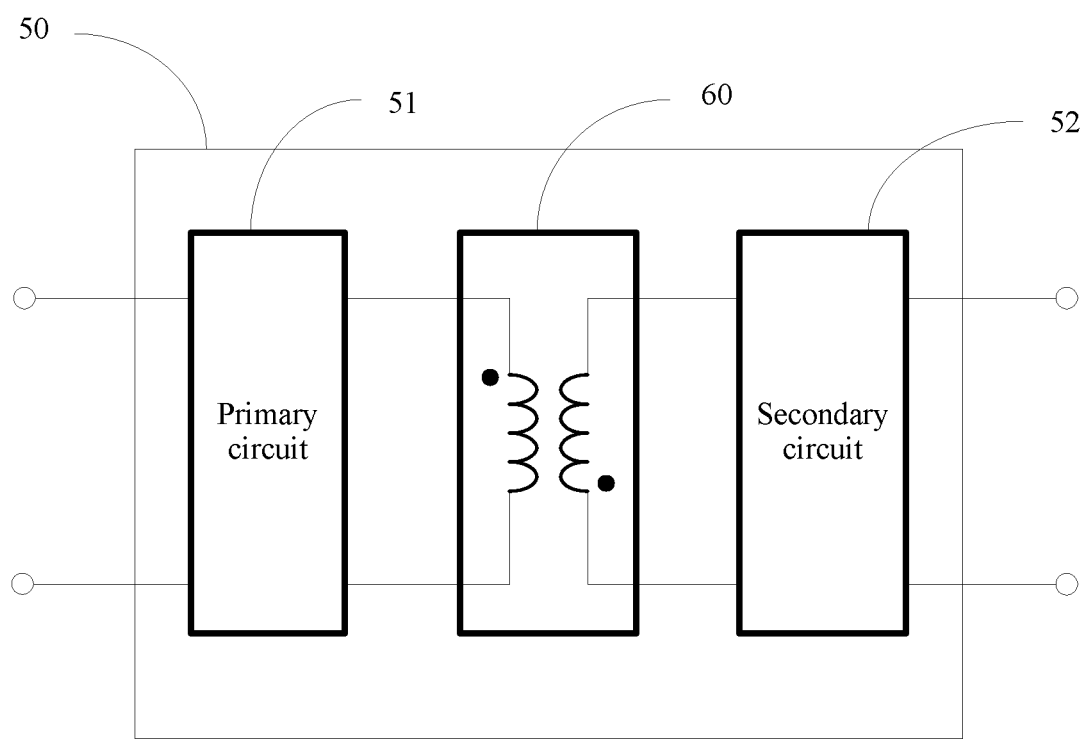
FIG. 5 is a schematic diagram of a power conversion circuit according to another embodiment of this application.

FIG. 5 is a schematic diagram of the power conversion circuit 50 according to an embodiment of this application. As shown in FIG. 5, the power conversion circuit 50 includes the primary circuit 51, the secondary circuit 52, and the planar transformer 60. A structure of the primary circuit 51 is the same as or similar to that of the primary circuit 21 in FIG. 2. The secondary circuit 52 is the same as or similar to the secondary circuit 22 in FIG. 2. Details are not described herein again. The planar transformer 60 is described next.

Figure 6:
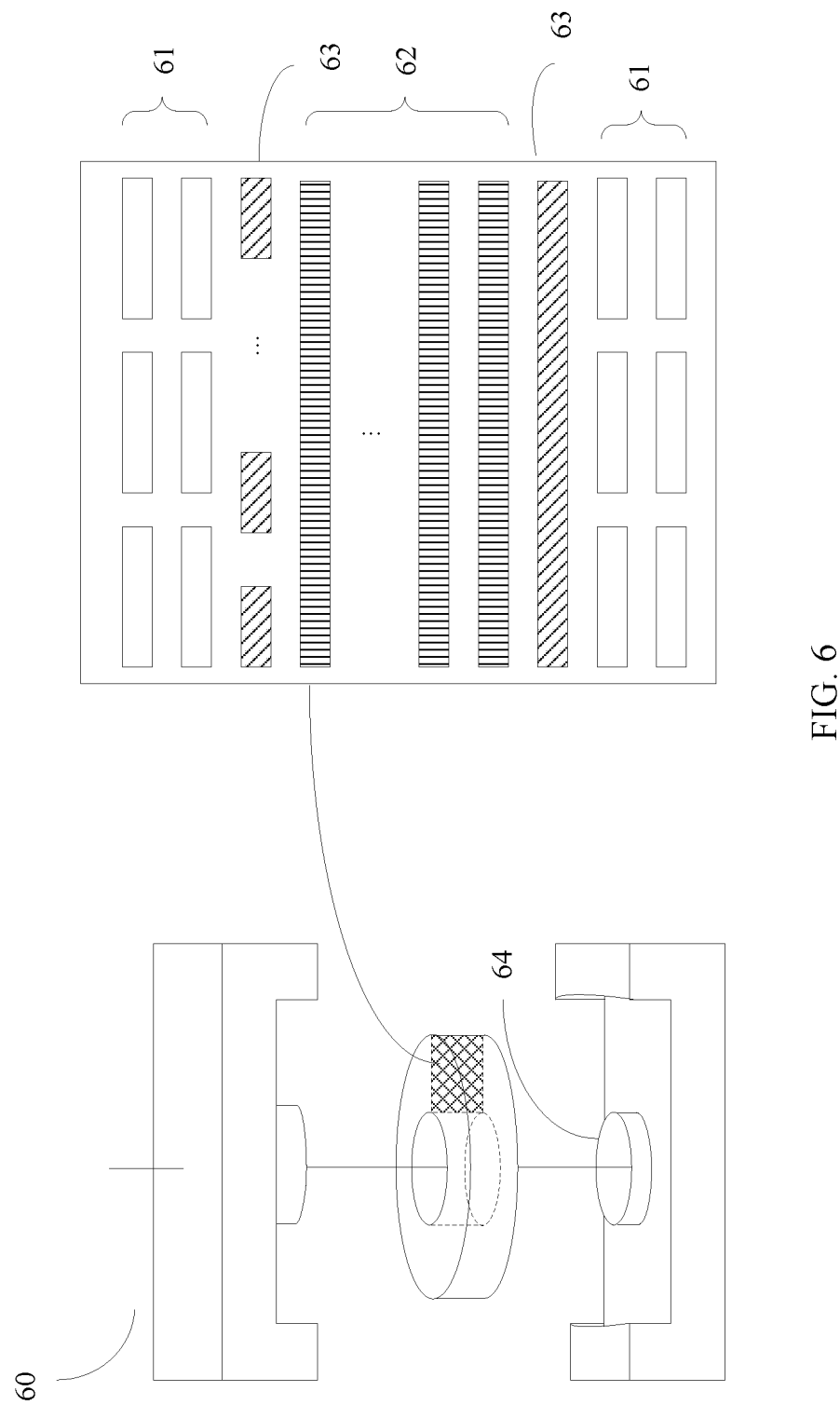
FIG. 6 is a schematic structural diagram of a planar transformer according to an embodiment of this application.

FIG. 6 is a schematic structural diagram of the planar transformer 60 according to an embodiment of this application. As shown in FIG. 6, the planar transformer 60 includes a primary winding 61, a secondary winding 62, and a charge balance winding 63. The planar transformer 60 may further include a magnetic core 64. A material of the magnetic core 64 is not limited in this embodiment of this application. For example, the magnetic core 64 may be of an EE type, an EI type, or an RM type. A fiber post of the magnetic core 64 may be provided with the primary winding 61, the secondary winding 62, and the charge balance winding 63 that are formed by a plurality of layers of circuit boards.

Figure 7:
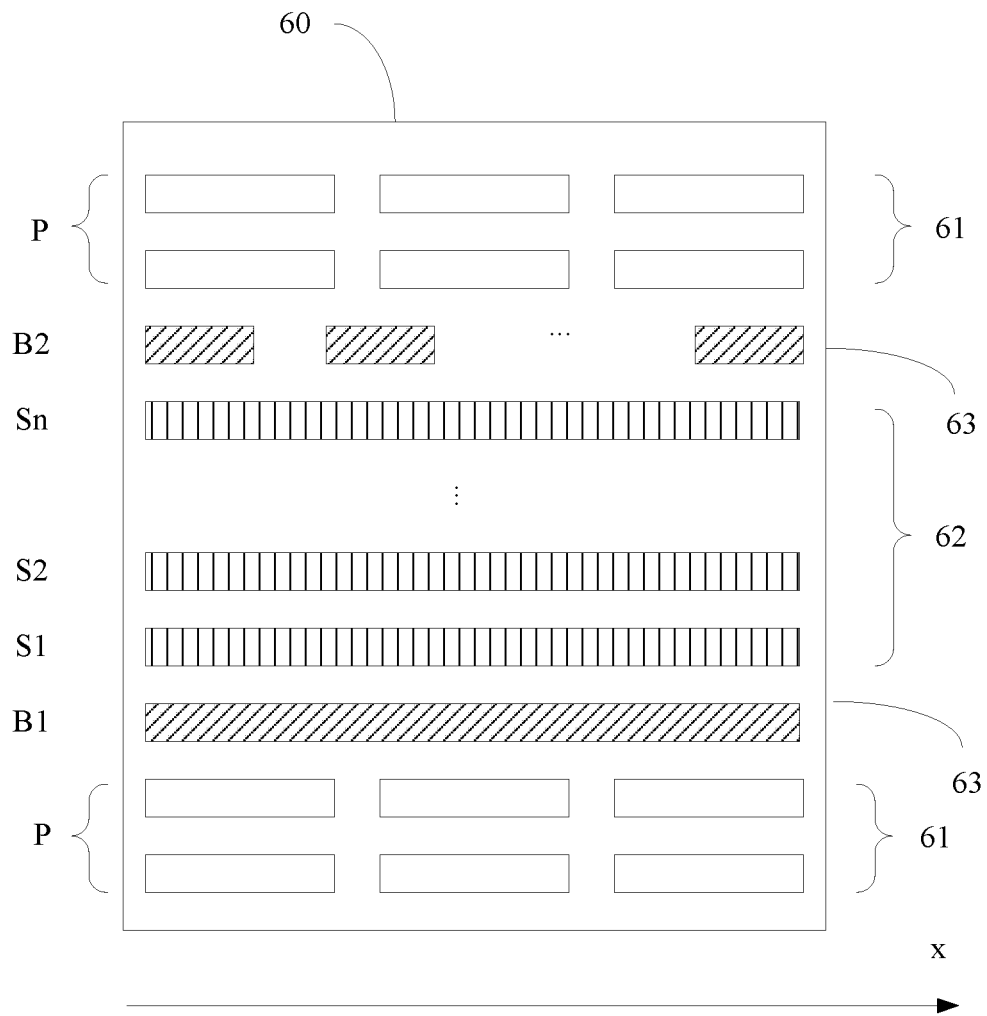
FIG. 7 is a cross-sectional schematic diagram of a planar transformer according to another embodiment of this application.

FIG. 7 is a cross-sectional schematic diagram of the planar transformer 60 according to an embodiment of this application. As shown in FIG. 7, the primary winding 61 may include at least one primary winding layer. Primary winding layers included in the primary winding 61 may be represented by P1, P2, ..., and Pn. In FIG. 7, P is used to indicate all primary winding layers. It should be noted that, because cross sections of the planar transformer 60 are symmetric, FIG. 7 is a half-cross-sectional schematic diagram of the planar transformer 60. Similarly, FIG. 11, FIG. 14, and FIG. 15 below each are a half-cross-sectional schematic diagram of a planar transformer.

The primary winding 61 may include a primary power winding. Further, the primary winding 61 may further include an auxiliary power supply winding.

The auxiliary power supply winding may be a winding that is in the power conversion circuit and that provides a low-power supply for a circuit other than a main power circuit. The circuit other than the main power circuit may include, for example, a drive circuit, a control circuit, or a detection circuit.

The at least one primary winding layer may be provided with a coil of the primary power winding, or may be provided with a coil of the auxiliary power supply winding. The coil may be formed by a conductive layer. Coils of the primary power winding are connected in series. The primary winding 61 may include a first primary winding layer. The first primary winding layer may be provided with at least some coils of the primary power winding, or may be provided with at least some coils of the auxiliary power supply winding.

The secondary winding 62 may include at least one secondary winding layer. Secondary winding layers included in the secondary winding 62 may be represented by S1, S2, . . . , and Sn. Similar to the primary winding 61, coils disposed at the at least one secondary winding layer are connected in series. The secondary winding 62 may include a first secondary winding layer.

The charge balance winding 63 may include at least one charge balance winding layer. The at least one charge balance winding layer may be represented by B1, B2, or the like. The charge balance winding layer is described using an example in which the at least one charge balance winding layer includes a first charge balance winding layer. The first charge balance winding layer may be any one of the at least one charge balance winding layer. The first charge balance winding layer may be disposed between the first primary winding layer and the first secondary winding layer, and is adjacent to the first primary winding layer and the first secondary winding layer. An $N_{s1}{}^{th}$ turn of coil to an $(N_{s1}+B_1-1)^{th}$ turn of coil in the secondary winding are disposed at the first secondary winding layer, and a first turn of coil in the secondary winding is configured to connect to a potential cold point of the secondary circuit of the power conversion circuit, where $N_{s1}$ and $B_1$ are positive numbers, and $N_1$ is greater than or equal to $N_{b1}$, where $N_1$ turns of coils are disposed at the first charge balance winding layer. When the planar transformer works, an average value of first induced voltages generated by $N_{b1}$ turns of coils is equal to an average value of second induced voltages generated by the first secondary winding layer, where $N_1$ and $N_{b1}$ are positive numbers.

That the first charge balance winding layer is adjacent to the first primary winding layer and the first secondary winding layer means that there is no other winding layer between the first charge balance winding layer and the first primary winding layer, and there is no other winding layer between the first charge balance winding layer and the first secondary winding layer, either.

In this embodiment of this application, the charge balance winding is disposed between the primary winding and the secondary winding of the planar transformer, and a quantity of turns of coils at the first charge balance winding layer included in the charge balance winding is designed such that when the planar transformer works, induced voltages of at least some coils in the first charge balance winding layer can be used to balance an induced voltage of the first secondary winding layer, to suppress common mode noise generated by the secondary winding, thereby improving noise suppression performance.

Further, because the common mode noise can be fully suppressed, for the power conversion circuit in this embodiment of this application, a Y capacitor bridged between the primary circuit and the secondary circuit may be removed, to provide a safer power conversion circuit without a Y capacitor.

Further, the at least one charge balance winding may further include a second charge balance winding layer. Disposition of the second charge balance winding layer is similar to that of the first charge balance winding layer. For example, the primary winding 61 further includes a second primary winding layer. The secondary winding 62 further includes a second secondary winding layer. An $N_{s2}{}^{th}$ turn of coil to an $(N_{s2}+B_2-1)^{th}$ turn of coil in the secondary winding are disposed at the second secondary winding layer, where $N_{s2}$ and $B_2$ are positive numbers. The charge balance winding 63 further includes a second charge balance winding layer. The second charge balance winding layer is disposed between the second primary winding layer and the second secondary winding layer, and is adjacent to the second primary winding layer and the second secondary winding layer. A first terminal of the second charge balance winding layer is configured to connect to a potential cold point of the primary circuit of the power conversion circuit. $N_2$ turns of coils are disposed at the second charge balance winding layer, where $N_2$ is greater than or equal to $N_{b2}$. When the planar transformer works, an average value of third induced voltages generated by $N_{b2}$ turns of coils is equal to an average value of fourth induced voltages generated by the second secondary winding layer, where $N_2$ and $N_{b2}$ are positive numbers.

That the second charge balance winding layer is adjacent to the second primary winding layer and the second secondary winding layer means that there is no other winding layer between the second charge balance winding layer and the second primary winding layer, and there is no other winding layer between the second charge balance winding layer and the second secondary winding layer, either.

In this embodiment of this application, the charge balance winding is disposed between the primary winding and the secondary winding of the planar transformer, the charge balance winding includes the first charge balance winding layer and the second charge balance winding layer, and a quantity of turns of coils in the charge balance winding is designed such that when the planar transformer works, induced voltages of at least some coils in the charge balance winding can be used to balance an induced voltage of the secondary winding, to suppress common mode noise generated by the secondary winding, thereby improving noise suppression performance.

Further, based on the disposition of $N_1$ turns of coils, an induced current generated by the charge balance winding can be further used to counterbalance a noise current to ground generated by the primary winding, thereby further improving the noise suppression performance. For a disposition manner of the $N_1$ turns of coils or the N2 turns of coils, detailed descriptions are provided below with reference to FIG. 9 and FIG. 10.

In an example, the primary winding 61 includes a primary power winding, the first terminal of the first charge balance winding layer and a first terminal of the primary power winding are dotted terminals, and the first terminal of the primary power winding is configured to connect to a hot point of the primary circuit. In this case, a direction of an induced current generated by the first charge balance winding layer is opposite to a direction of a noise current to ground generated by the primary winding, thereby suppressing the noise current to ground generated by the primary winding.

The hot point of the primary circuit may be a circuit node or a network having a voltage jump on a primary side of a circuit topology as a primary switching transistor is turned on and off, for example, a node at which the primary power winding is connected to the primary switching transistor.

In this embodiment of this application, the first terminal of the first charge balance winding layer and the first terminal of the primary power winding are set as the dotted terminals such that the direction of the induced current generated by the first charge balance winding layer is opposite to the direction of the noise current to ground generated by the primary winding, thereby suppressing the noise current to ground generated by the primary winding, and improving noise suppression performance of the power conversion circuit.

Figure 8:
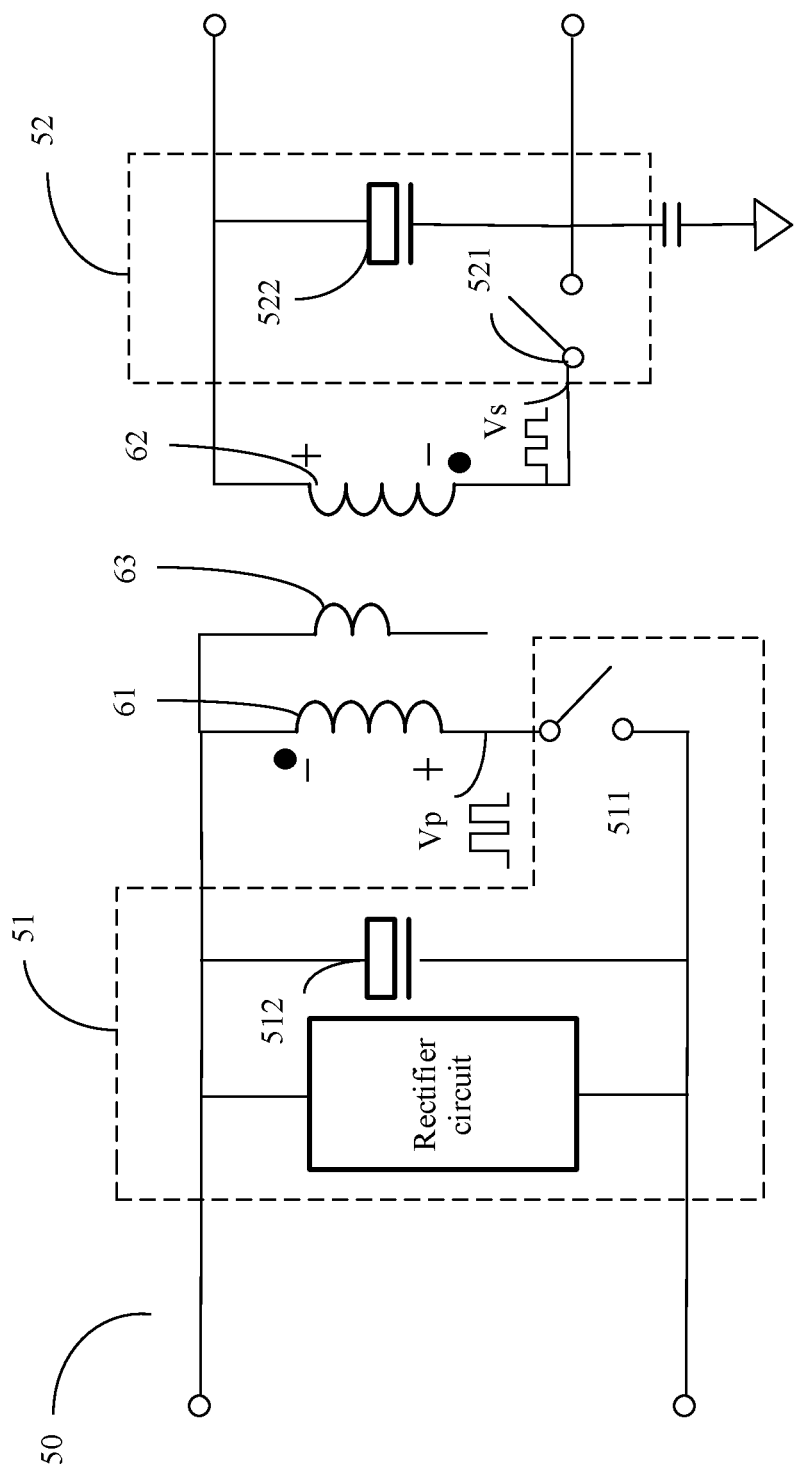
FIG. 8 is a schematic diagram of a connection relationship between a power conversion circuit and a planar transformer according to an embodiment of this application.

FIG. 8 is a schematic diagram of a connection relationship between the power conversion circuit 50 and the planar transformer 60 according to an embodiment of this application. As shown in FIG. 8, the primary circuit 51 includes a primary switching transistor 511, a primary filter capacitor 512, and a rectifier circuit. The secondary circuit 52 includes a secondary rectifier diode 521 and a secondary filter capacitor 522. The primary filter capacitor 512 and the secondary filter capacitor 522 may be electrolytic capacitors. Usually, a node connected to either of two ends of the primary filter capacitor 512 is a primary potential cold point, or a ground node of the primary circuit may be a primary potential cold point. A node connected to either of two ends of the secondary filter capacitor 522 is a secondary potential cold point.

As shown in FIG. 8, one terminal of the primary winding 61 is configured to connect to a primary potential cold point of the power conversion circuit 50. One terminal of the secondary winding 62 is configured to connect to a secondary potential cold point of the power conversion circuit. For example, two terminals of the primary winding 61 may be respectively connected to the primary switching transistor 511 and the primary filter capacitor 512. Two terminals of the secondary winding 62 are respectively connected to the secondary rectifier diode 521 and the secondary filter capacitor 522. One terminal of the charge balance winding 63 is configured to connect to the primary potential cold point of the power conversion circuit 50. The other terminal of the charge balance winding may be unconnected. The "unconnected" may mean that the other terminal of the charge balance winding is electrically connected to no conductor, and is electrically connected to no element. For example, one terminal of the charge balance winding 63 may be connected to the primary filter capacitor 512. That the charge balance winding 63 includes the first charge balance winding layer is used as an example, a first terminal of $N_1$ turns of coils at the first charge balance winding layer is configured to connect to the primary potential cold point, and a second terminal of the $N_1$ turns of coils at the first charge balance winding layer may be unconnected, to be specific, is electrically connected to neither a conductor nor an element.

In some examples, when the primary winding further includes the auxiliary power supply winding, the charge balance winding layer may be replaced by the auxiliary power supply winding. Further, one terminal of the auxiliary power supply winding is connected to the primary potential cold point. It is assumed that a first turn of coil in the auxiliary power supply winding is connected to the primary potential cold point. The $N_1$ turns of coils disposed at the first charge balance winding layer may be the first turn of coil to an $N_1^{th}$ turn of coil in the auxiliary power supply winding.

In the foregoing example, if the auxiliary power supply winding includes P turns of coils, where P is greater than $N_1$, an $(N_1+1)^{th}$ turn of coil to a $P^{th}$ turn of coil in the auxiliary power supply winding may be disposed at the at least one primary winding layer included in the primary winding.

In this embodiment of this application, the charge balance winding is disposed in the planar transformer, and the auxiliary power supply winding may be used as the charge balance winding, to suppress noise in the power conversion circuit, reduce a volume of the planar transformer, and reduce manufacturing costs.

It should be noted that, one terminal of the first charge balance winding layer needs to be connected to the primary potential cold point, and the other terminal of the first charge balance winding layer may be unconnected or may be connected to another potential node. For example, when coils at the first charge balance winding layer are at least some coils in the auxiliary power supply winding, one terminal of the first charge balance winding layer is connected to the primary potential cold point, and the other terminal of the first charge balance winding layer may not be unconnected, but is connected to the $(N_1+1)^{th}$ turn of coil in the auxiliary power supply winding.

Optionally, a relative position of the primary winding and the secondary winding may include at least the following three forms. For example, in a first form, referring to FIG. 7, the primary winding may be disposed on two sides of the secondary winding, to be specific, some primary winding layers of the primary winding are disposed on one side of the secondary winding, and the other primary winding layers of the primary winding are disposed on the other side of the secondary winding, to form a sandwich structure. Based on the foregoing "sandwich" structure, a high-frequency eddy current loss and leakage inductance of a winding can be reduced. Alternatively, in a second form, the secondary winding may be disposed on two sides of the primary winding. Alternatively, in a third form, all primary winding layers included in the primary winding may be located on one side of all secondary winding layers included in the secondary winding.

In the first form or the second form, there are two positions at which the primary winding is adjacent to the secondary winding. Therefore, the charge balance winding may include two charge balance winding layers, each disposed between a primary winding layer and a secondary winding layer that are adjacent to each other. In the third form, the charge balance winding may include one charge balance winding layer.

Further, to eliminate the common mode noise, because one terminal of the charge balance winding 63 is connected to the primary potential cold point, a common mode noise current generated by a jump voltage Vp of the primary winding 61 can be shielded. In addition, the quantity of turns of coils in the charge balance winding 63 may be set such that a common mode current generated by a potential of the charge balance winding 63 counterbalances a noise charge generated by a potential of the secondary winding 62, that is, a charge circulates between the charge balance winding and the secondary winding, to try to prevent the charge from flowing to the ground to generate common mode noise.

Figure 9:
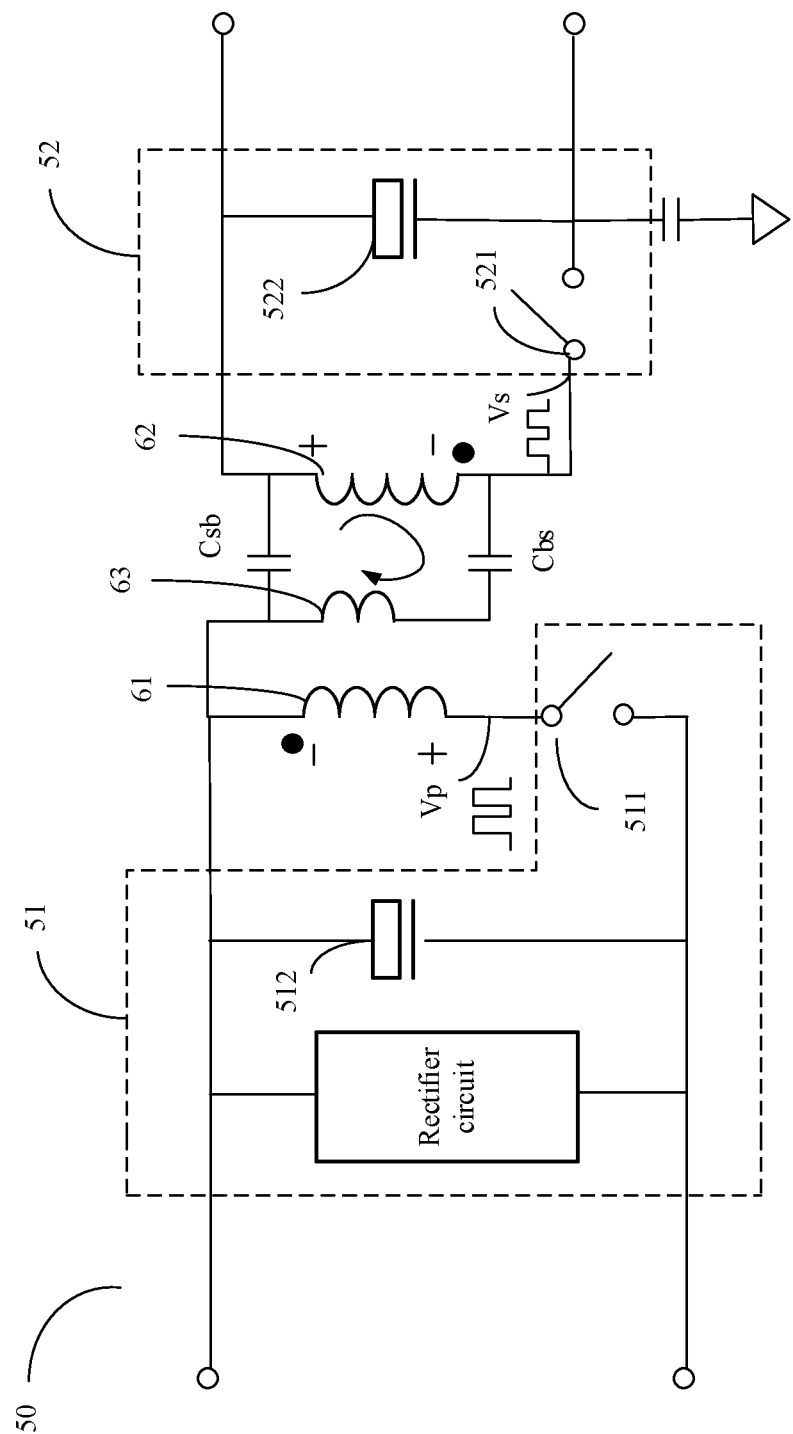
FIG. 9 is a schematic diagram of a principle of suppressing common mode noise by a power conversion circuit according to an embodiment of this application.

FIG. 9 is a schematic diagram of a principle of suppressing the common mode noise by the power conversion circuit according to an embodiment of this application. As shown in FIG. 9, it can be seen from a circuit diagram of a noise path that, with introduction of the charge balance winding 63, the common mode noise current generated by the jump voltage Vp can be shielded, and in addition, the common mode current generated by the potential of the charge balance winding 63 counterbalances the charge generated by the potential of the secondary winding 62 (that is, the charge circulates between the charge balance winding 63 and the secondary winding 62), to prevent the charge from flowing to the ground, thereby eliminating the common mode noise current.

In this embodiment of this application, the charge balance winding 63 is disposed between the primary power winding and the secondary winding 62 of the planar transformer 60, and the quantity of turns of coils in the charge balance winding 63 is designed such that when the planar transformer 60 works, an average voltage of induced voltages formed by the charge balance winding 63 is used to balance an average voltage of induced voltages formed by the first secondary winding layer such that noise charges between the charge balance winding and the adjacent secondary winding can counterbalance each other, thereby reducing noise in the power conversion circuit.

Further, the first charge balance winding layer is used as an example, and the first charge balance winding layer includes the $N_1$ turns of coils. When the planar transformer works, the induced voltages of the $N_{b1}$ turns of coils in the $N_1$ turns of coils are used to balance the induced voltages of the first secondary winding layer. That is, based on the disposition of $N_1$ turns of coils, the average value of the induced voltages of the $N_{b1}$ turns of coils in the $N_1$ turns of coils is equal to the average value of the induced voltages of the first secondary winding layer, where $N_1$ and $N_{b1}$ are positive numbers.

It should be noted that, in actual application, because of a characteristic and a principle of a winding, a quantity of turns of coils in this embodiment of this application may not be an integer, for example, may be 1.5 or 2.4.

$N_1$ may be equal to or not equal to $N_{b1}$. When $N_1$ is not equal to $N_b$, $N_1$ may be greater than $N_{b1}$.

When $N_1$ is not equal to $N_{b1}$, when the planar transformer 60 works, based on the disposition of $N_1$ turns of coils, the induced current generated by the charge balance winding can be used to counterbalance a noise current to ground generated by a voltage jump of a first terminal of the primary winding 61. The noise current to ground is a common mode noise current.

The first terminal of the primary winding 61 may be one terminal of the primary winding 61 that is connected to the primary switching transistor 511. For example, the voltage jump of the first terminal of the primary winding 61 may be a voltage jump generated by the jump voltage Vp.

It should be noted that, ideally, based on the disposition of $N_1$ turns of coils, a direction of the induced current generated by the charge balance winding 63 is opposite to the direction of the noise current to ground generated by the primary winding 61, and a value of the induced current is equal to a value of the noise current to ground. However, in an actual case, because of relatively complex parasitic parameters, based on the disposition of $N_1$ turns of coils, a difference between the value of the induced current and the value of the noise current to ground is less than a first preset threshold, thereby improving the noise suppression performance of the power conversion circuit. A value of the first preset threshold may be determined according to an actual case.

Further, based on the setting of $N_1$ turns of coils, there is a potential difference between the first charge balance winding layer and the first secondary winding layer. The potential difference causes the first secondary winding layer to generate an induced current. Based on the setting of $N_1$ turns of coils, an induced current generated between the first charge balance winding layer and the first secondary winding layer is used to counterbalance the noise current to ground generated by the voltage jump of the first terminal of the primary winding, or may be used to balance a noise current generated when a potential jump of the primary winding is coupled to the secondary winding through an inter-turn gap of the charge balance winding. It should be further noted that, when the charge balance winding includes a plurality of charge balance winding layers, a quantity of turns of each of the plurality of charge balance winding layers may be set such that a sum of induced charges generated by the plurality of charge balance winding layers can counterbalance the noise current to ground generated by the voltage jump of the first terminal of the primary winding.

For example, if the charge balance winding 63 includes the first charge balance winding layer, $N_1$ and $N_{b1}$ satisfy the following condition:

$N_1 = N_{b1} + C_1$, and $N_{b1} = 2*N_{s1} + B_1 - 2$, where $C_1$ is a real number, and $C_1$ turns of coils are configured to at least balance, using a noise current generated when a generated induced voltage is coupled to the secondary winding, the noise current generated when the potential jump of the primary winding is coupled to the secondary winding through the inter-turn gap of the charge balance winding. A value range of $C_1$ fluctuates within a particular range based on different environmental parameters. For example, the value range of $C_1$ may be [0, 1.1*$N_{b1}$]. In some examples, a value of $C_1$ may be 0, 0.1$N_{b1}$, 0.2$N_{b1}$, 0.3$N_{b1}$, 0.4$N_{b1}$, 0.5$N_{b1}$, 0.6$N_{b1}$, 0.7$N_{b1}$, 0.8$N_{b1}$, 0.9$N_{b1}$, 1.0$N_{b1}$, 1.05$N_{b1}$, 0.35$N_{b1}$, or the like.

The noise current generated when the induced voltage generated by the $C_1$ turns of coils is coupled to the secondary winding may include the foregoing induced current generated between the first charge balance winding layer and the first secondary winding layer. In addition, the noise current generated when the induced voltage generated by the $C_1$ turns of coils is coupled to the secondary winding may be used to balance a noise current generated due to another undesirable effect, for example, may be further used to balance the noise current to ground generated by the voltage jump of the first terminal of the primary winding.

For example, when the charge balance winding 63 includes the first charge balance winding layer and the second charge balance winding layer, $N_1$ and $N_2$ may be set such that a sum of induced charges generated by the two charge balance winding layers can counterbalance the noise current to ground generated by the voltage jump of the first terminal of the primary winding.

$N_2$, $N_{b1}$, and $N_{b2}$ satisfy the following condition:

$N_2 = N_{b2} + C_2$, $N_{b1} = 2*N_{s1} + B_1 - 2$, $N_{b2} = 2*N_{s2} + B_2 - 2$, and $N_{b2} \geq N_{b1}$, where $C_2$ is a real number, and $C_2$ turns of coils are configured to at least balance, using a noise current generated when a generated induced voltage is coupled to the secondary winding, the noise current generated when the potential jump of the primary winding is coupled to the secondary winding through the inter-turn gap of the charge balance winding. A value range of $C_2$ fluctuates within a particular range based on different environmental parameters. For example, the value range of $C_2$ may be [0, 1.1*$N_{b2}$]. In some examples, a value of $C_2$ may be 0, 0.1$N_{b2}$, 0.2$N_{b2}$, 0.3$N_{b2}$, 0.4$N_{b2}$, 0.5$N_{b2}$, 0.5$N_{b2}$, 0.6$N_{b2}$, 0.7$N_{b2}$, 0.7$N_{b2}$, 0.8$N_{b2}$, 0.9$N_{b2}$, 1.0$N_{b2}$1.05$N_{b2}$, 0.35$N_{b2}$, or the like.

The noise current generated when the induced voltage generated by the $C_2$ turns of coils is coupled to the secondary winding may include an induced current generated between the second charge balance winding layer and the second secondary winding layer. In addition, the noise current generated when the induced voltage generated by the $C_2$ turns of coils is coupled to the secondary winding may be used to balance a noise current generated due to another undesirable effect, for example, may be further used to balance the noise current to ground generated by the voltage jump of the first terminal of the primary winding.

In this embodiment of this application, the charge balance winding 63 is disposed between the primary power winding and the secondary winding 62 of the planar transformer, and the quantity of turns of coils in the charge balance winding 63 is designed such that when the planar transformer 60 works, induced voltages of at least some coils in the charge balance winding 63 can be used to balance an induced voltage of the first secondary winding layer, to suppress common mode noise generated by the secondary winding, thereby improving noise suppression performance. Further, based on the disposition of $N_1$ turns of coils, the induced current generated by the charge balance winding can be further used to counterbalance the noise current to ground generated by the primary winding, thereby further improving the noise suppression performance.

Figure 10:
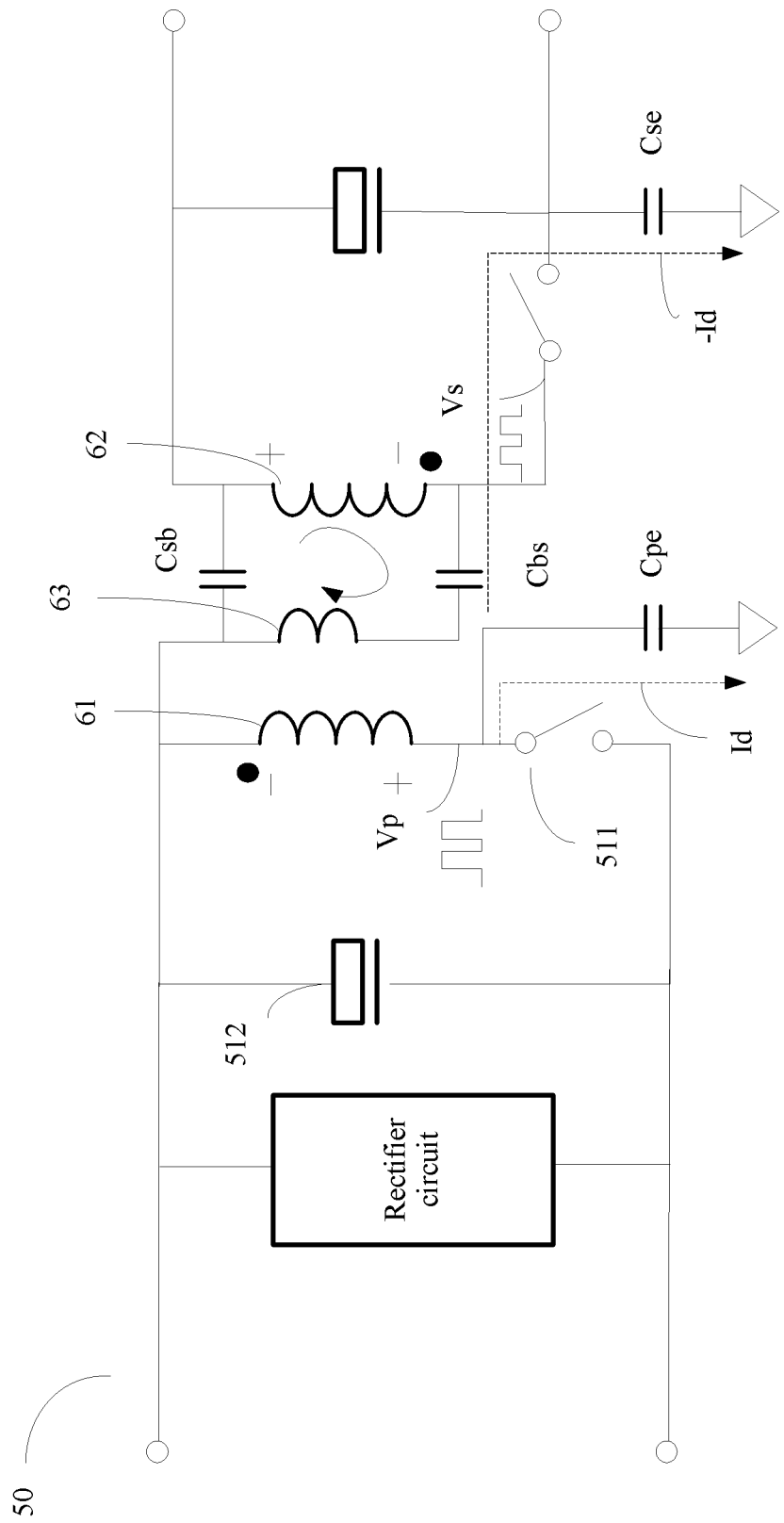
FIG. 10 is a schematic diagram of a noise path of a noise current to ground of a power conversion circuit according to an embodiment of this application.

For ease of understanding of the foregoing solution, FIG. 10 is a schematic diagram of a noise path of the noise current to ground in the power conversion circuit 50. As shown in FIG. 10, the first terminal of the primary winding 61 may be connected to a first terminal of the primary switching transistor 511 in the primary circuit, and the voltage jump of the first terminal of the primary winding 61 may be the jump voltage Vp generated when the primary switching transistor 511 is conducted or turned off at high frequency. Capacitance to ground Cpe exists between the primary switching transistor 511 and the ground. When the planar transformer 60 works, the jump voltage Vp generates a noise current to ground Id using the capacitance to ground Cpe.

Optionally, the value of $C_1$ or $C_2$ is related to a common mode current to ground generated by the jump voltage of the first terminal of the primary winding 61. It is assumed that the charge balance winding 63 includes X charge balance winding layers. Quantities of turns of coils at the X charge balance winding layers that need to be corrected are respectively $C_1$, $C_2$, ..., and $C_x$. It is assumed that $C_1+C_2+...+C_x=C'$, where X is an integer not less than 1. In some embodiments, the primary switching transistor in the primary circuit is provided with a heat sink. When the heat sink is connected to the primary potential cold point, a noise current generated by the primary switching transistor for the heat sink circulates between the heat sink and the switching transistor, instead of flowing to the ground. In this case, the first terminal of the primary winding has no noise current to ground. Therefore, C' may be set to 0. In some other embodiments, with development of power density and a high frequency, the primary switching transistor usually uses a surface-mount process, and there is no heat sink, or the heat sink is not connected to the primary potential cold point. Therefore, at a first terminal at which the secondary winding is connected to the primary switching transistor (namely, the first terminal of the secondary winding) generates the noise current to ground Id. In this case, a value of C' needs to be set such that an induced current of C' turns of coils in the charge balance winding is used to counterbalance the noise current to ground Id generated by the voltage jump of the first terminal of the primary winding. For example, in the circuit in FIG. 10, the C' turns of coils need to be added to the charge balance winding, to counterbalance the noise current to ground generated by the voltage jump of the first terminal of the primary winding.

In this case, if the charge balance winding includes one charge balance winding layer, the C' turns of coils may be added to the charge balance winding layer. If the charge balance winding includes a plurality of charge balance winding layers, corrected C' turns of coils may be added to one or more of the charge balance winding layers. For example, if the charge balance winding layer includes the first charge balance winding layer and the second charge balance winding layer, all of the C' turns of coils may be added to the second charge balance winding layer. Alternatively, the C' turns of coils may be divided into two parts, and the two parts are added to the first charge balance winding layer and the second charge balance winding layer respectively. For example, the C' turns of coils added to the charge balance winding causes the charge balance winding to generate more induced currents, a value of the induced currents is the same as that of Id, and a direction of the induced currents is opposite to that of Id, namely −Id. Alternatively, it may be understood that, it is assumed that an induced charge of the primary switching transistor for the capacitance to ground is $Q_k$, based on the configuration of C', a value of all charges generated by the secondary winding is equal to that of $Q_k$, and an electrode of the charge is opposite to that of $Q_k$, thereby counterbalancing a noise current generated by the first terminal of the primary winding to the ground, that is, counterbalancing a noise current generated by the primary switching transistor to the ground.

Optionally, in some examples, for a case in which the magnetic core of the planar transformer is not connected to the primary potential cold point, it is assumed that an induced charge of the magnetic core for the capacitance to ground is $Q_c$. The quantity of turns of coils in the charge balance winding may be set. Based on the configuration of C', a value of all charges generated by the secondary winding is equal to that of $Q_c$, and an electrode of the charge is opposite to that of $Q_c$.

Optionally, in some examples, for a case in which neither the primary switching transistor of the power conversion circuit nor the magnetic core is connected to the primary potential cold point, it is assumed that an induced charge of the primary switching transistor and the magnetic core for the capacitance to ground is $Q_d$. The quantity of turns of coils in the charge balance winding may be set. Based on the configuration of C', a value of all charges generated by the secondary winding is equal to that of $Q_d$, and an electrode of the charge is opposite to that of $Q_d$.

The first charge balance winding layer is used as an example below to describe the configuration of $N_1$.

Optionally, $N_1$ may satisfy the following condition:

$$N_1=N_{b1}+C_1, \text{ and} \tag{1}$$

$$N_{b1}=2*N_{s1}+B_1-2. \tag{2}$$

$N_1$ and $N_b$ are positive numbers, $C_1$ is a constant number, and the value range of $C_1$ fluctuates within a particular range based on different environmental parameters. For example, the value range of $C_1$ may be [$0.2*N_{b1}$, $1.1*N_{b1}$]. In some examples, the value of $C_1$ may be $0.3N_{b1}$, $0.4N_{b1}$, $0.5N_{b1}$, $0.6N_{b1}$, $0.7N_{b1}$, $0.8N_{b1}$, $0.9N_{b1}$, $1.0N_{b1}$, $1.05N_{b1}$, $0.35N_{b1}$, or the like.

A process of deriving the formula (2) is described below. It is assumed that the secondary winding includes m turns of coils, where m is a positive number. A secondary coil connected to the secondary potential cold point may be defined as a first turn of coil in the secondary winding. It is assumed that the $N_{s1}^{th}$ turn of coil to the $(N_{s1}+B_1-1)^{th}$ turn of coil in the secondary winding are disposed at the first secondary winding layer adjacent to the first charge balance winding layer, and it can be learned based on theoretical analysis of charge balance that, when the following formulas are satisfied, the first charge balance winding layer and the adjacent first secondary winding layer achieve a charge balance:

$$[V_{ta}+V_{ta+B1}]/2=N_{b1}*V_{pt}/2, \quad (3)$$

$$V_{ta}=(N_{s1}-1)*V_{pt}, \text{ and,} \quad (4)$$

$$V_{ta+B1}=(N_{s1}+B_1-1)*V_{pt} \quad (5)$$

$N_{bt}$ indicates the quantity of turns of coils at the first charge balance winding layer, $V_{ta}$ indicates an induced voltage of an $(N_{s1}-1)^{th}$ turn of coil in the secondary winding, $V_{ta+B1}$ indicates an induced voltage of the $(N_{s1}+B_1-1)^{th}$ turn of coil in the secondary winding, and $V_{pt}$ indicates an induced voltage of one turn of coil.

The formula (2) may be obtained through simultaneous derivation from the formulas (3) to (5):

$$N_{b1}=2*N_{s1}+B_1-2. \quad (2)$$

Optionally, in some embodiments, if a quantity of turns of coils disposed at the first secondary winding layer is 1, that is, $B_1=1$, the formula (2) may be simplified as the following formula:

$$N_{b1}=2*N_{s1}-1. \quad (6)$$

In a specific example, a process of determining $C_1$ continues to be described below. It is assumed that the primary switching transistor 511 is a field-effect transistor. Parasitic capacitance Cpe to ground of a source (S) of the primary switching transistor 511, a jump voltage Vp of a drain (D) of the primary switching transistor 511, parasitic capacitance Cse to ground of the potential cold point of the secondary circuit, and a maximum jump voltage Vb of the charge balance winding may be measured. Common mode capacitance Csb between the charge balance winding 63 and the secondary winding 62 of the planar transformer 60 and common mode capacitance Cbs between the secondary winding 62 and the charge balance winding 63 may be obtained through calculation and measurement.

It is assumed that Qpe indicates a noise charge generated by Vp using Cpe, and Qpe may be obtained according to a formula (7):

$$Qpe=Vp*Cpe \quad (7)$$

It is assumed that Qb1 indicates a compensation noise charge generated after the quantity of turns $C_1$ is corrected for the charge balance winding, and Qb1 may be obtained according to a formula (8):

$$Qb1 = N_{s1} * V_{pt} * \frac{Csb*Cse}{Csb+Cse} - (N_{b1}+C_1)*V_{pt} * \frac{Cbs*Cse}{Cbs+Cse} \quad (8)$$

When Qpe=Qb1, noise charges in an entire system are balanced. Therefore, a formula (9) is obtained with reference to the formulas (7) and (8):

$$C_1 = \frac{N_{s1}*V_{pt}*\frac{Csb*Cse}{Csb+Cse} - Vp*Cpe}{V_{pt}*\frac{Cbs*Cse}{Cbs+Cse}} - N_{b1} \quad (9)$$

$N_{b1}$ indicates a quantity of turns of coils existing before correction for the first charge balance winding layer, $N_{s1}$ indicates that the first secondary winding layer adjacent to the first charge balance winding layer is wound from the $N_{s1}^{th}$ turn of coil in the secondary winding, and $V_{pt}$ indicates an induced voltage of one turn of coil.

It should be noted that, in a high-frequency EMI model, various stray parasitic parameters in actual engineering application are very complex, because $C_1$ calculated according to the formula (9) may be allowed to fluctuate within a particular range in actual application.

Figure 11:
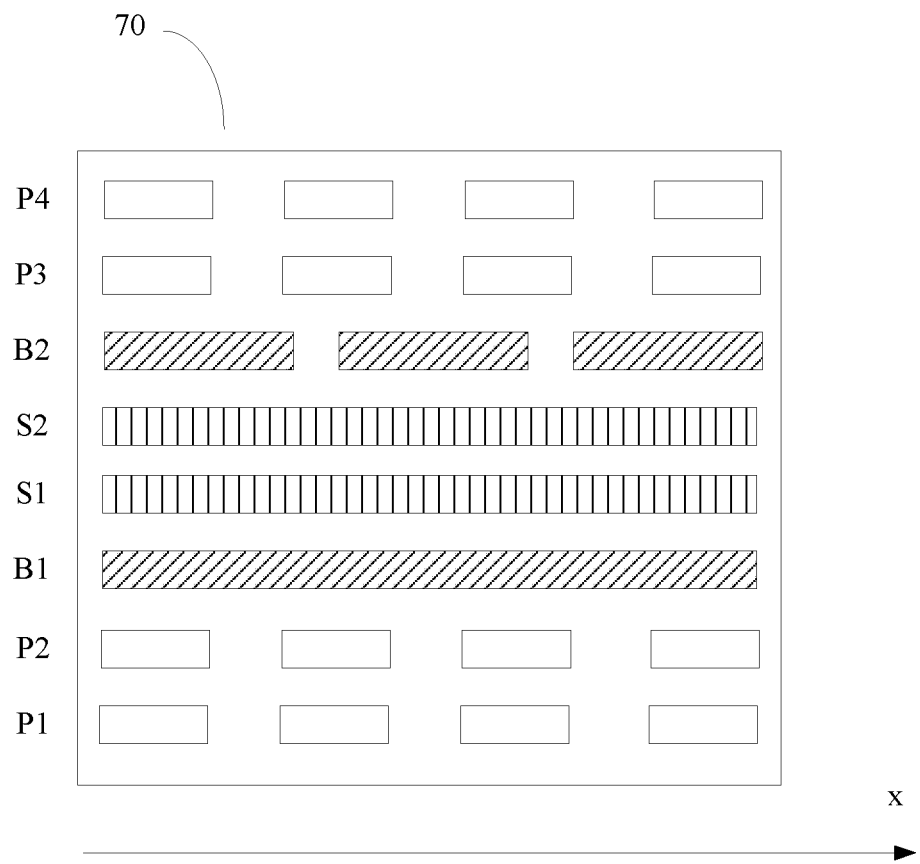
FIG. 11 is a cross-sectional schematic diagram of a planar transformer according to another embodiment of this application.

FIG. 11 is a cross-sectional schematic diagram of a planar transformer 70 according to another embodiment of this application. As shown in FIG. 11, the planar transformer 70 includes a primary winding, a secondary winding, and a charge balance winding. The primary winding may be disposed on two sides of the secondary winding. The charge balance winding includes two charge balance winding layers. Primary winding layers included in the primary winding may be represented by P1, P2, . . . , and Pn. Secondary winding layers included in the secondary winding may be represented by S1, S2, . . . , and Sn. The foregoing two charge balance winding layers may be represented by B1 and B2 respectively.

A quantity of turns of coils in the primary winding of the planar transformer 70 and a quantity of turns of coils in the secondary winding of the planar transformer 70 may be set based on a preset turn ratio. For example, it is assumed that a turn ratio of the primary winding to the secondary winding of the planar transformer 70 in FIG. 11 is 16:2. Therefore, the planar transformer 70 is provided with four primary winding layers (P1, P2, P3, and P4), two secondary winding layers (S1 and S2), and two charge balance winding layers (B1 and B2). Each primary winding layer is provided with four turns of coils, and each secondary winding layer is provided with one turn of coil. The charge balance winding layer B1 is disposed between the primary winding layer P2 and the secondary winding layer S1, and the charge balance winding layer B2 is disposed between the primary winding layer P3 and the secondary winding layer S2. Therefore, a plurality of layers of circuit boards are successively P1, P2, B1, S1, S2, B2, P3, and P4 from a stacking direction.

Still referring to FIG. 11, when correction of a quantity of turns of coils in the charge balance winding is not considered, a method for determining a quantity of turns of coils in the charge balance winding layer is described below. It is assumed that a secondary coil Ws1 is disposed at the secondary winding layer 51, and a secondary coil Ws2 is disposed at the secondary winding layer S2. It is assumed that one terminal of the secondary coil Ws1 is connected to a secondary potential cold point, and the other terminal of the secondary coil Ws1 is connected to Ws2. For the charge balance winding layer B1, a first turn of coil in the secondary winding is disposed at the secondary winding layer S1 adjacent to the charge balance winding layer B1. Therefore, $N_{s1}=1$ and $B_1=1$. It is assumed that $C_1=0$, and the foregoing assigned values are substituted into the formula (1) and the formula (2), to obtain $N_1=Nb_1=1$. Therefore, one turn of coil Wb1 is disposed at the charge balance winding layer B1. For the charge balance winding layer B2, a second turn of coil in the secondary winding is disposed at the secondary winding layer S2 adjacent to the charge balance winding layer B2. Therefore, $N_{s1}=2$ and $B_1=1$. It is assumed that $C_1=0$, and the foregoing assigned values are substituted into the formula (1) and the formula (2), to obtain $N_1=Nb_1=3$. Therefore, three turns of coils Wb2 are disposed at the charge balance winding layer B2. One terminal of the coil Wb1 and one terminal of the coil of Wb2 are separately connected to the primary potential cold point, and the other terminal of the coil Wb1 and the other terminal of the coil Wb2 are unconnected, that is, no electrical connection exists.

In some specific embodiments, to satisfy use safety, the primary circuit and the secondary circuit of the power conversion circuit need to satisfy insulation performance. Because the charge balance winding layers B1 and B2 are connected to the primary potential cold point, the charge balance winding belongs to the primary circuit of the power conversion circuit. Therefore, a sufficient distance needs to be reserved between the charge balance winding layer B1 and the secondary winding layer S1, and between the charge balance winding layer B2 and the secondary winding layer S2, to satisfy an insulation requirement. For example, in specific implementation, the insulation requirement can be satisfied when thickness of a medium between inner conductors of a plurality of layers of PCB boards reaches 0.4 millimeter (mm). Alternatively, the insulation requirement can be satisfied if thickness of a medium between inner conductors is made to be less than 0.4 mm when the medium can implement additional insulation.

Figure 12:
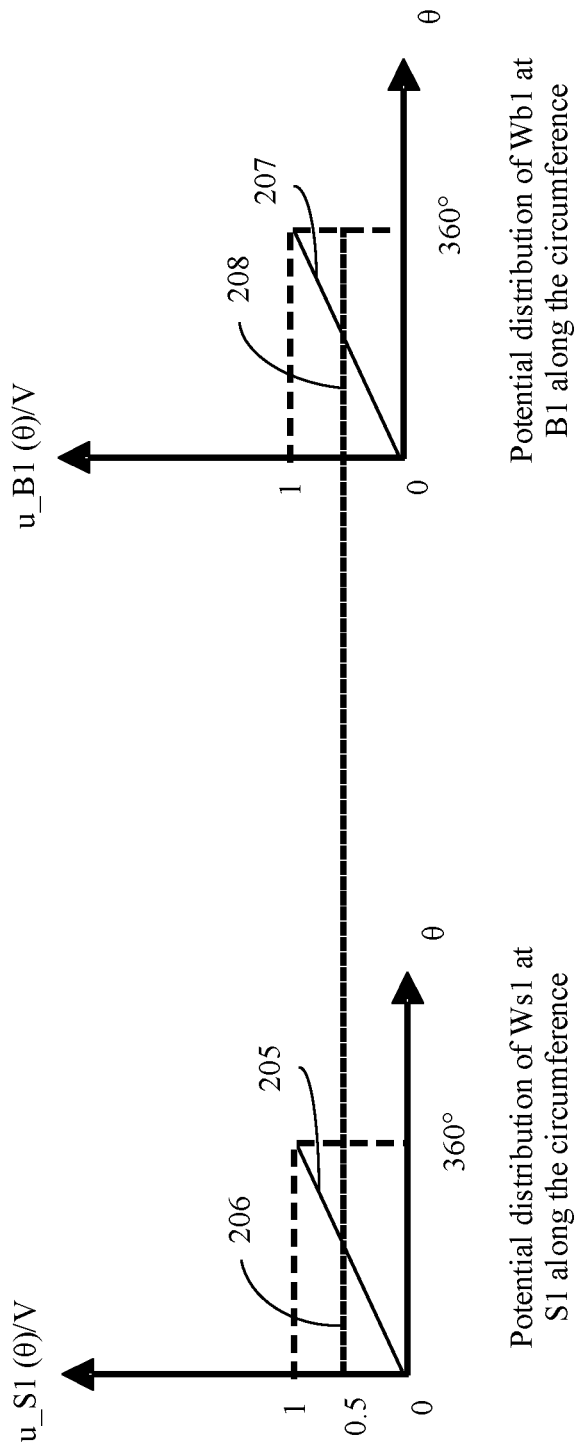
FIG. 12 is a schematic diagram of potential distribution when a coil at a secondary winding layer is extended along the circumference according to an embodiment of this application.

A principle of suppressing noise by the planar transformer is described below based on a specific example of the planar transformer 70 in FIG. 11. It can be learned from a principle of the transformer that, induced voltages of all turns of coils in the transformer are equal. Therefore, it is assumed that an induced voltage of each turn of coil is 1 volt (V) below. FIG. 12 is a schematic diagram of potential distribution when the coil Ws1 at the secondary winding layer S1 is extended along the circumference. As shown in FIG. 12, potential distribution 205 of the coil Ws1 along the circumference is 0 V to 1 V, and an average potential 206 is (0 V+1 V)/2=0.5 V. To ensure that an induced charge of the coil Ws1 at the secondary winding layer S1 is zero, an average potential of the coil Wb1 at the charge balance winding layer B1 opposite to S1 also needs to be 0.5 V. There is one turn of coil Wb1 at the charge balance winding layer B1. FIG. 12 is also a schematic diagram of potential distribution when the coil Wb1 at the charge balance winding layer B1 is extended along the circumference. As shown in FIG. 12, potential distribution 207 of the coil Wb1 along the circumference is 0 V to 1 V such that an average potential 208 of the charge balance winding layer B1 is 0.5 V. It can be learned that, the average potential of the coil Ws1 at the secondary winding layer S1 is equal to the average potential of the charge balance winding layer B1.

Figure 13:
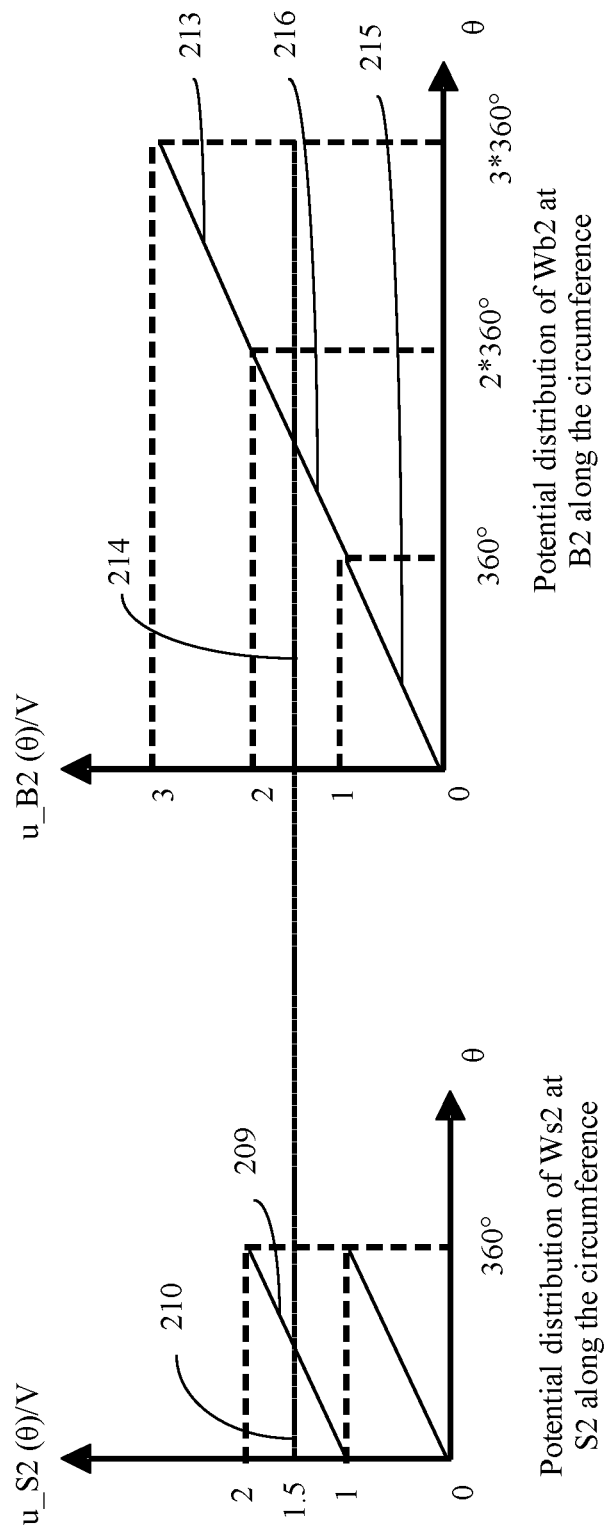
FIG. 13 is a schematic diagram of potential distribution when a coil at a secondary winding layer is extended along the circumference according to another embodiment of this application.

Similarly, FIG. 13 is a schematic diagram of potential distribution when the coil Ws2 at the secondary winding layer S2 is extended along the circumference. As shown in FIG. 13, potential distribution 209 of the coil Ws2 along a circumferential angle is 1 V to 2 V, and an average potential 210 is (1 V+2 V)/2=1.5 V. To ensure that an induced charge of the coil Ws2 at the secondary winding layer S2 is zero, an average potential of the coil Wb2 at the charge balance winding layer B2 opposite to S2 also needs to be 1.5 V. There are three turns of coils Wb2 at the charge balance winding layer B2. FIG. 13 is also a schematic diagram of potential distribution when the three turns of coils Wb2 at the charge balance winding layer B2 are extended along the circumference. As shown in FIG. 13, potential distribution 215 of a first turn of coil Wb2 along a circumferential angle is 0 V to 1 V, potential distribution 216 of a second turn of coil Wb2 along a circumferential angle is 1 V to 2 V, and potential distribution 213 of a third turn of coil Wb2 along a circumferential angle is 2 V to 3 V such that an average potential 214 of the charge balance winding layer B2 is (0 V+3 V)/2=1.5 V. It can be learned that, the average potential of the coil Ws2 at the secondary winding layer S2 is equal to the average potential of the charge balance winding layer B2.

It can be learned through the foregoing analysis that, if the average potential of the coil Wb1 at the charge balance winding layer B1 is the same as that of the coil Ws1 at the secondary winding layer S1, there is no net induced charge in Ws1. Similarly, if the average potential of the coil Wb2 at the charge balance winding layer B2 is the same as that of the coil Ws2 at the secondary winding layer S2, there is no net induced charge in Ws2. Therefore, there is no net induced charge in the entire secondary winding, thereby eliminating common mode noise generated by the secondary winding.

Figure 14:
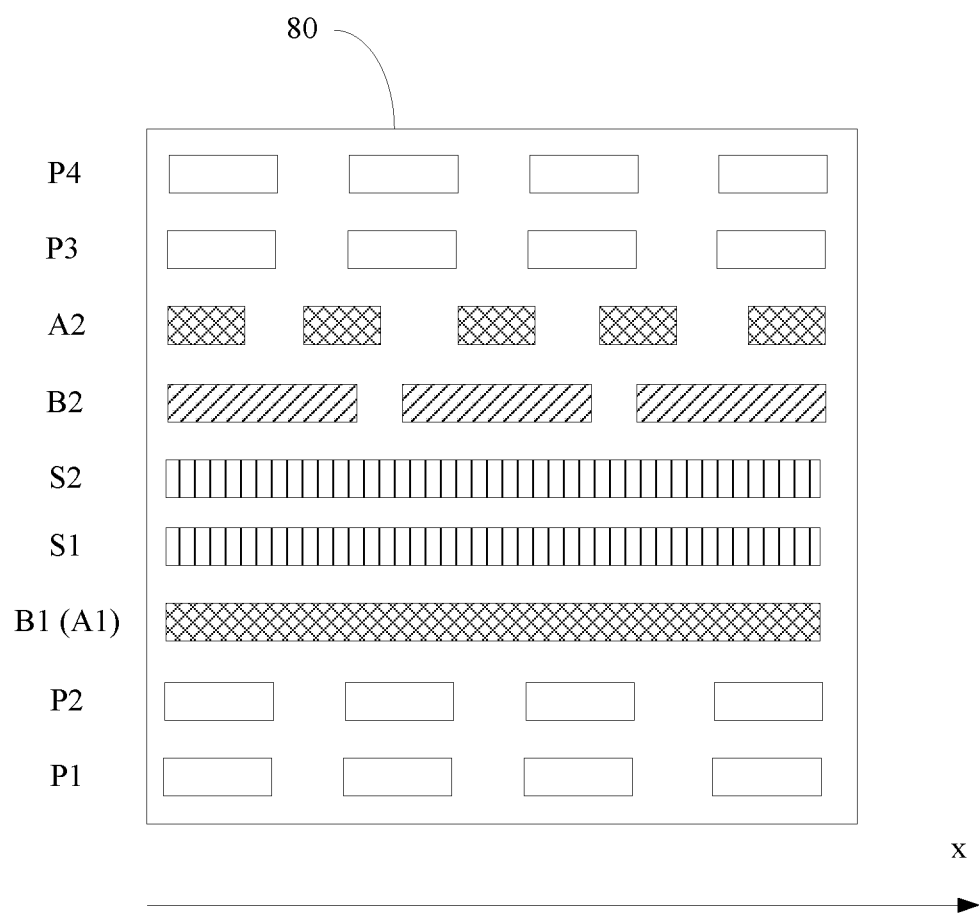
FIG. 14 is a cross-sectional schematic diagram of a planar transformer according to another embodiment of this application.
Figure 15:
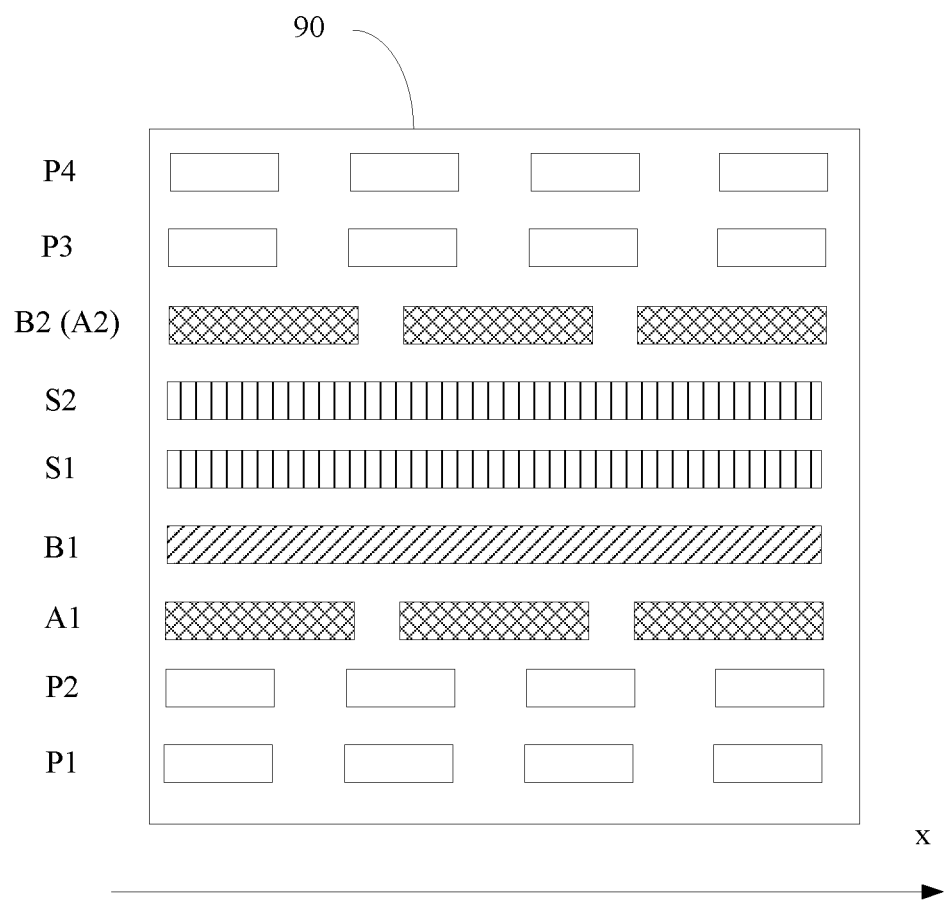
FIG. 15 is a cross-sectional schematic diagram of a planar transformer according to another embodiment of this application.

FIG. 14 and FIG. 15 each are a cross-sectional schematic diagram of a planar transformer according to another embodiment of this application. A charge balance winding layer B1 in FIG. 14 is implemented by an auxiliary power supply winding. A charge balance winding layer B2 in FIG. 15 is implemented by an auxiliary power supply winding.

Referring to FIG. 14, based on the planar transformer 70 in FIG. 11, a primary winding of the planar transformer 90 further includes an auxiliary power supply winding. The auxiliary power supply winding includes auxiliary power supply winding layers A1 and A2. It is assumed that there are six turns of coils connected in series in total that are disposed at A1 and A2, a first turn of coil in the auxiliary power supply winding is connected to a primary potential cold point, and the coils included in the auxiliary power supply winding are successively a first turn Na1, a second turn Na2, . . . , and a sixth turn Na6.

As shown in FIG. 14, the charge balance winding layer B1 in the planar transformer 70 in FIG. 11 may be replaced by the first turn of coil Na1 in the auxiliary power supply winding. Three turns of coils at the balance winding layer B2 in the planar transformer 80 remain unchanged. The second turn of coil to the sixth turn of coil in the auxiliary power supply winding of the planar transformer 80 may be disposed at the primary winding layer A2 of the primary winding.

Referring to FIG. 15, based on the planar transformer 70 in FIG. 11, a primary winding of a planar transformer 90 further includes an auxiliary power supply winding. The auxiliary power supply winding includes auxiliary power supply winding layers A1 and A2. It is assumed that there are six turns of coils connected in series in total that are disposed at A1 and A2, a first turn of coil in the auxiliary power supply winding is connected to a primary potential cold point, and the coils included in the auxiliary power supply winding are successively a first turn Na1, a second turn Na2, . . . , and a sixth turn Na6.

As shown in FIG. 15, the charge balance winding layer B2 in the planar transformer 70 in FIG. 11 may be replaced by the first turn of coil to the third turn of coil Na1, Na2, and Na3 in the auxiliary power supply winding. One turn of coil at a balance winding layer B1 in the planar transformer 90 remains unchanged. The fourth turn of coil to the sixth turn of coil in the auxiliary winding of the planar transformer 90 may be disposed at the primary winding layer A2 of the primary winding.

In this embodiment of this application, the auxiliary power supply winding may be used to form a charge balance winding, thereby improving noise suppression performance of a power conversion circuit, reducing costs of the planar transformer, and improving space utilization of the planar transformer.

Optionally, the charge balance winding may be set as a toroidal winding. For the toroidal winding, although an average potential of charge balance winding layers included in the charge balance winding is the same as an average potential of opposite secondary winding layers, all turns of coils distributed from inside to outside at the charge balance winding layer have different lengths. If all the turns of coils at the charge balance winding layer have a same width, all the turns of coils have different areas such that all the turns of coils have different capacitance for the secondary winding layer. Consequently, net induced charges of secondary coils at the adjacent secondary winding layer cannot be zero.

Optionally, for the foregoing problem, this embodiment of this application provides a method for gradually decreasing the widths of all the turns of coils at the charge balance winding layer from inside to outside such that capacitance between the charge balance winding layer and the adjacent secondary winding layer is evenly distributed to reduce net induced charges at the secondary winding layer when the planar transformer works.

In some embodiments, N turns of coils at the first charge balance winding layer form a toroidal winding, and a width of an $i^{th}$ turn of coil is greater than a width of an $(i+1)^{th}$ turn of coil in the toroidal winding from inside to outside, where $N-1 \geq i \geq 1$.

In this embodiment of this application, the widths of all the turns of coils at the charge balance winding layer are gradually decreased from inside to outside such that the capacitance between the charge balance winding layer and the adjacent secondary winding layer is evenly distributed, thereby improving the noise suppression performance.

Figure 16:
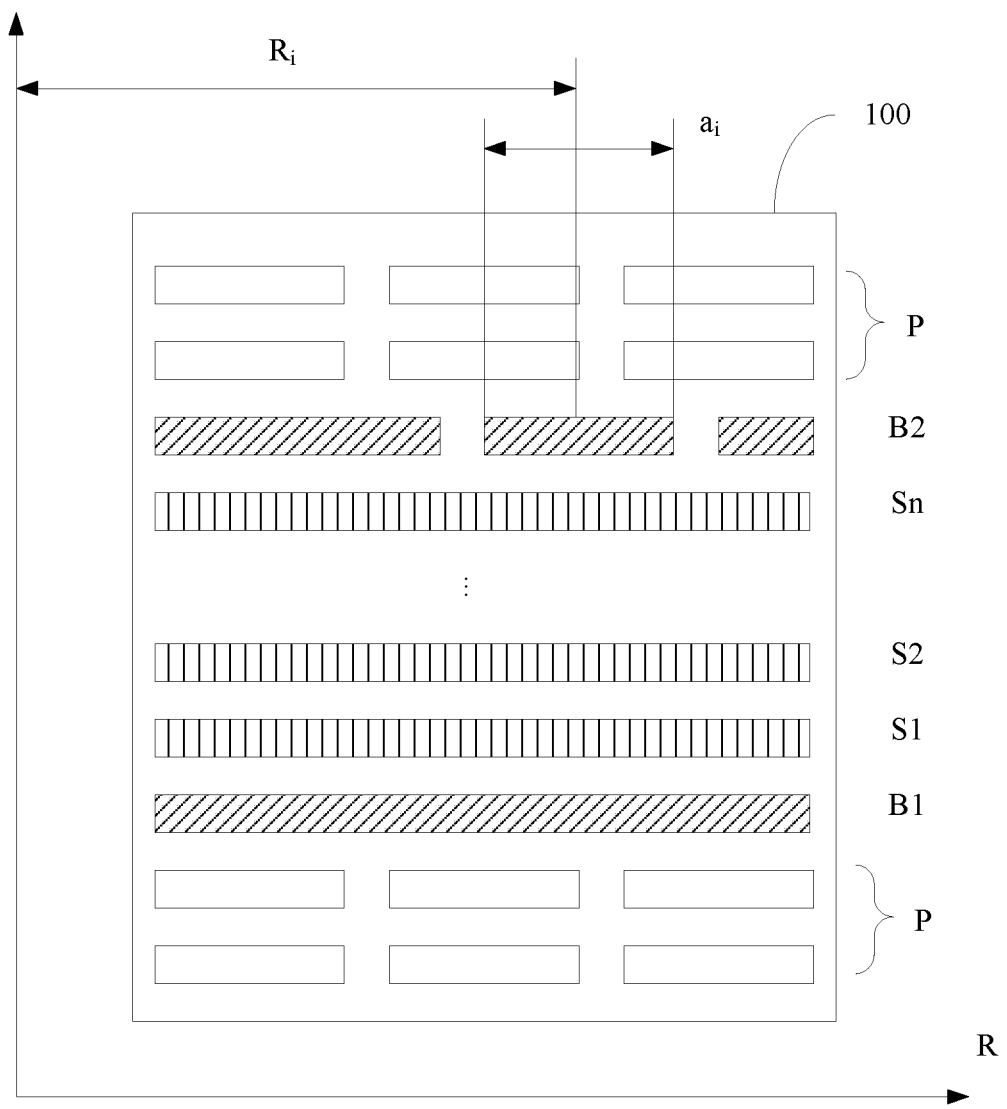
FIG. 16 is a cross-sectional schematic diagram of a planar transformer according to another embodiment of this application.

For example, FIG. 16 is a cross-sectional schematic diagram of a planar transformer 100 according to another embodiment of this application. As shown in FIG. 16, a charge balance winding layer B2 includes three turns of coils. Widths of the three turns of coils are gradually decreased as an average radius is increased.

In some examples, widths of all turns of coils at the first charge balance winding layer may be set such that areas of all the turns of coils are equal, and distributed capacitance of all the turns of coils for the adjacent first secondary winding layer is the same. Further, a width of an $i^{th}$ turn of coil at the first charge balance winding layer may satisfy the following condition:

$$R_i = R_{i+1} * a_{i+1}/a_i \quad (10)$$

$R_i$ is an average radius of the $i^{th}$ turn of coil, $R_{i+1}$ is an average radius of the $(i+1)^{th}$ turn of coil, $a_i$ is the width of the $i^{th}$ turn of coil, and $a_{i+1}$ is the width of the $(i+1)^{th}$ turn of coil.

In this embodiment of this application, for the toroidal winding, the widths of all the turns of coils at the charge balance winding layer from inside to outside are set such that the areas of all the turns of coils are equal, and the capacitance between the charge balance winding layer and the adjacent secondary winding layer is evenly distributed, thereby improving the noise suppression performance.

Optionally, in some examples, one turn of coil is disposed at the first secondary winding layer adjacent to the first charge balance winding layer, that is, $B_1 = 1$.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

What is claimed is:

1. A planar transformer of a power conversion circuit, wherein the planar transformer comprises:
   a primary winding comprising a first primary winding layer, wherein the first primary winding layer comprises at least one turn of coil located in a same plane;
   a secondary winding comprising a first secondary winding layer, wherein a first turn of coil in the secondary winding is configured to couple to a potential first cold point of a secondary circuit of the power conversion circuit, and wherein the first secondary winding layer is configured to generate second induced voltages when the planar transformer is operating; and
   a charge balance winding comprising a first charge balance winding layer, wherein the first charge balance winding layer is disposed between the first primary winding layer and the first secondary winding layer, wherein the first charge balance winding layer is adjacent to the first primary winding layer and the first secondary winding layer, and wherein the first charge balance winding layer comprises:
   $N_1$ turns of coils; and
   a first terminal configured to couple to a potential second cold point of a primary circuit of the power conversion circuit, wherein $N_{b1}$ turns of coils of the $N_1$ turns of coils in the first charge balance winding layer is configured to generate first induced voltages when the planar transformer is operating;
   wherein an average value of the first induced voltages generated by $N_{b1}$ turns of coils is equal to an average value of the second induced voltages generated by the first secondary winding layer, wherein $N_1$ and $N_{b1}$ are positive integers, and wherein $N_1$ is greater than or equal to $N_{b1}$.

2. The planar transformer of claim 1, wherein an $N_{s1}{}^{th}$ turn of coil to an $(N_{s1}+B_1-1)^{th}$ turn of coil in the secondary winding are disposed at the first secondary winding layer, wherein $N_{s1}$ and $B_1$ are positive numbers, wherein $N_1$ and $N_{b1}$ satisfy the following conditions:

$$N_1=N_{b1}+C_1; \text{ and}$$

$$N_{b1}=2*N_{s1}+B_1-2,$$

wherein $C_1$ is a real number, and wherein $C_1$ turns of coils are configured to balance, using a first noise current generated when a generated induced voltage is coupled to the secondary winding, a second noise current generated when a potential jump of the primary winding is coupled to the secondary winding through an inter-turn gap of the charge balance winding.

3. The planar transformer of claim 2, wherein a value range of $C_1$ is $[0, 1.1*N_{b1}]$.

4. The planar transformer of claim 2, wherein $B_1=1$.

5. The planar transformer of claim 1, wherein the primary winding further comprises a second primary winding layer, wherein the secondary winding further comprises a second secondary winding layer, wherein an $N_{s2}{}^{th}$ turn of coil to an $(N_{s2}+B_2-1)^{th}$ turn of coil in the secondary winding are disposed at the second secondary winding layer, wherein $N_{s2}$ and $B_2$ are positive numbers, wherein the charge balance winding further comprises a second charge balance winding layer, wherein the second charge balance winding layer is disposed between the second primary winding layer and the second secondary winding layer, wherein the second charge balance winding layer is adjacent to the second primary winding layer and the second secondary winding layer, wherein the second charge balance winding layer, comprises:

a second terminal configured to couple to the potential second cold point; and $N_2$ turns of coils disposed, wherein $N_2$ is greater than or equal to $N_{b2}$, and wherein an average value of third induced voltages generated by $N_{b2}$ turns of coils is equal to an average value of fourth induced voltages generated by the second secondary winding layer when the planar transformer works, and wherein $N_2$ and $N_{b2}$ are positive numbers.

6. The planar transformer of claim 5, wherein $N_2$, $N_{b1}$, and $N_{b2}$ satisfy the following conditions:

$$N_2=N_{b2}+C_2;$$

$$N_{b1}=2*N_{s1}+B_1-2;$$

$$N_{b2}=2*N_{s2}+B_2-2; \text{ and}$$

$$N_{b2} \geq N_{b1},$$

wherein $C_2$ is a real number, wherein $N_{s1}$ and $B_1$ are positive numbers, and wherein $C_2$ turns of coils are configured to balance, using a first noise current generated when a generated induced voltage is coupled to the secondary winding, a second noise current generated when a potential jump of the primary winding is coupled to the secondary winding through an inter-turn gap of the charge balance winding.

7. The planar transformer of claim 6, wherein a value range of $C_2$ is $[0, 1.1*N_{b2}]$.

8. The planar transformer of claim 1, wherein the primary winding further comprises a primary power winding comprising a third terminal, wherein the first terminal and the third terminal are dotted terminals, and wherein the third terminal is configured to couple to a hot point of the primary circuit.

9. The planar transformer of claim 1, wherein the primary winding further comprises an auxiliary power supply winding, wherein the $N_1$ turns of coils disposed at the first charge balance winding layer comprise a first turn of coil to an $N_1{}^{th}$ turn of coil in the auxiliary power supply winding, and wherein the first turn of coil in the auxiliary power supply winding is configured to couple to a working ground of the primary circuit.

10. The planar transformer of claim 1, wherein the primary winding is disposed on two sides of the secondary winding.

11. The planar transformer of claim 1, wherein the secondary winding is disposed on two sides of the primary winding.

12. The planar transformer of claim 1, wherein a fourth terminal of the $N_1$ turns of coils disposed at the first charge balance winding layer is not electrically coupled to a conductor.

13. The planar transformer of claim 1, wherein a fourth terminal of the $N_1$ turns of coils disposed at the first charge balance winding layer is not electrically coupled to an element.

14. The planar transformer of claim 1, wherein the $N_1$ turns of coils at the first charge balance winding layer form a toroidal winding, wherein a width of an $i^{th}$ turn of coil in the toroidal winding is greater than a width of an $(i+1)^{th}$ turn of coil in the toroidal winding, wherein an average radius of the $i^{th}$ turn of coil is less than an average radius of the $(i+1)^{th}$ turn of coil, and wherein $N_1-1 \geq i \geq 1$.

15. The planar transformer of claim 14, wherein the width of the $i^{th}$ turn of coil satisfies the following condition:

$$R_i=R_{i+1}*a_{i+1}/a_i,$$

wherein $R_i$ is the average radius of the $i^{th}$ turn of coil, wherein $R_{i+1}$ is the average radius of the $(i+1)^{th}$ turn of coil, wherein $a_i$ is the width of the $i^{th}$ turn of coil, and wherein $a_{i+1}$ is the width of the $(i+1)^{th}$ turn of coil.

16. A power conversion circuit comprising:

a primary circuit comprising a potential second cold point;

a secondary circuit comprising a potential first cold point; and a planar transformer, wherein the planar transformer is disposed between the primary circuit and the secondary circuit, and wherein the planar transformer comprises:

a primary winding comprising a first primary winding layer, wherein the first primary winding layer comprises at least one turn of coil located in a same plane;

a secondary winding comprising a first secondary winding layer, wherein a first turn of coil in the secondary winding is configured to couple to the potential first cold point, and wherein the first secondary winding layer is configured to generate second induced voltages when the planar transformer is operating; and a charge balance winding comprising a first charge balance winding layer, wherein the first charge balance winding layer is disposed between the first primary winding layer and the first secondary winding layer, wherein the first charge balance winding layer is adjacent to the first primary winding layer and the first secondary winding layer and wherein the first charge balance winding layer comprises:

a first terminal configured to couple to the potential second cold point; and $N_1$ turns of coils, wherein $N_{b1}$ turns of coils of the $N_1$ turns of coils in the first charge balance winding layer is configured to generate first induced voltages when the planar transformer is operating, wherein an average value of the first induced voltages generated by $N_{b1}$ turns of coils is equal to an average value of the second induced voltages generated by the first secondary winding layer wherein $N_1$ and $N_{b1}$ are positive integers, and wherein $N_1$ is greater than or equal to $N_{b1}$.

17. An adapter, comprising a power conversion circuit, wherein the power conversion circuit comprises:
   a primary circuit comprising a potential second cold point;
   a secondary circuit comprising a potential first cold point; and
   a planar transformer disposed between the primary circuit and the secondary circuit, wherein the planar transformer comprises:
      a primary winding comprising a first primary winding layer, wherein the first primary winding layer comprises at least one turn of coil located in a same plane;
      a secondary winding comprising a first secondary winding layer, wherein a first turn of coil in the secondary winding is configured to couple to the potential first cold point, and wherein the first secondary winding layer is configured to generate second induced voltages when the planar transformer is operating; and
      a charge balance winding comprising a first charge balance winding layer, wherein the first charge balance winding layer is disposed between the first primary winding layer and the first secondary winding layer, wherein the first charge balance winding layer is adjacent to the first primary winding layer and the first secondary winding layer, and wherein the first charge balance winding layer comprises:
         a first terminal configured to couple to the potential second cold point; and
         $N_1$ turns of coils, wherein $N_{b1}$ turns of coils of the $N_1$ turns of coils in the first charge balance winding layer is configured to generate first induced voltages when the planar transformer is operating, wherein an average value of the first induced voltages generated by $N_{b1}$ turns of coils is equal to an average value of the second induced voltages generated by the first secondary winding layer, wherein $N_1$ and $N_{b1}$ are positive integers, and wherein $N_1$ is greater than or equal to $N_{b1}$.

18. The adapter of claim 17, wherein an $N_{s1}^{th}$ turn of coil to an $(N_{s1}+B_1-1)^{th}$ turn of coil in the secondary winding are disposed at the first secondary winding layer, wherein $N_{s1}$ and $B_1$ are positive numbers, wherein $N_1$ and $N_{b1}$ satisfy the following conditions:

$$N_1 = N_{b1} + C_1; \text{ and}$$

$$N_{b1} = 2*N_{s1} + B_1 - 2,$$

wherein $C_1$ is a real number, and wherein $C_1$ turns of coils are configured to balance, using a first noise current generated when a generated induced voltage is coupled to the secondary winding, a second noise current generated when a potential jump of the primary winding is coupled to the secondary winding through an inter-turn gap of the charge balance winding.

19. The adapter of claim 18, wherein a value range of $C_1$ is $[0, 1.1*N_{b1}]$.

20. The adapter of claim 17, wherein the primary winding further comprises a second primary winding layer, wherein the secondary winding further comprises a second secondary winding layer, wherein an $N_{s2}^{th}$ turn of coil to an $(N_{s2}+B_2-1)^{th}$ turn of coil in the secondary winding are disposed at the second secondary winding layer, wherein $N_{s2}$ and $B_2$ are positive numbers, wherein the charge balance winding further comprises a second charge balance winding layer, wherein the second charge balance winding layer is disposed between the second primary winding layer and the second secondary winding layer, wherein the second charge balance winding layer is adjacent to the second primary winding layer and the second secondary winding layer, wherein the second charge balance winding layer comprises:
   a second terminal configured to couple to the potential second cold point; and
   $N_2$ turns of coils disposed, wherein $N_2$ is greater than or equal to $N_{b2}$, and wherein an average value of third induced voltages generated by $N_{b2}$ turns of coils is equal to an average value of fourth induced voltages generated by the second secondary winding layer when the planar transformer works, and wherein $N_2$ and $N_{b2}$ are positive numbers.

* * * * *

UNITED STATES PATENT AND TRADEMARK OFFICE
CERTIFICATE OF CORRECTION

PATENT NO. : 11,062,837 B2  
APPLICATION NO. : 16/871145  
DATED : July 13, 2021  
INVENTOR(S) : Peng Yu, Wei Chen and Jie Ren Page 1 of 1

It is certified that error appears in the above-identified patent and that said Letters Patent is hereby corrected as shown below:

In the Claims

Claim 16, Column 24, Line 66: "winding layer and wherein" should read "winding layer, and wherein"

Claim 16, Column 25, Line 10: "winding layer wherein" should read "winding layer, wherein"

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*